(12) United States Patent
Davies et al.

(10) Patent No.: US 11,659,146 B2
(45) Date of Patent: *May 23, 2023

(54) TEMPORAL MODELING OF PHASE MODULATORS IN MULTI-MODULATION PROJECTION

(71) Applicant: DOLBY LABORATORIES LICENSING CORPORATION, San Francisco, CA (US)

(72) Inventors: Trevor Davies, Walnut Creek, CA (US); Martin J. Richards, Gig Harbor, WA (US); Barret Lippey, Foster City, CA (US); Juan P. Pertierra, Fishers, IN (US); Christopher John Orlick, Furlong, PA (US); Peter Francis Van Kessel, San Mateo, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,792

(22) Filed: Jul. 13, 2021

(65) Prior Publication Data
US 2022/0006984 A1    Jan. 6, 2022

Related U.S. Application Data

(63) Continuation of application No. 16/954,756, filed as application No. PCT/US2018/066080 on Dec. 17, 2018, now Pat. No. 11,070,774.
(Continued)

(30) Foreign Application Priority Data

Apr. 12, 2018 (EP) .................................. 18166944

(51) Int. Cl.
*H04N 9/31* (2006.01)
*G02B 27/10* (2006.01)
(Continued)

(52) U.S. Cl.
CPC ............... *H04N 9/31* (2013.01); *G02B 26/06* (2013.01); *G02B 27/1046* (2013.01);
(Continued)

(58) Field of Classification Search
CPC ...... H04N 9/31; H04N 5/7416; H04N 9/3126; H04N 9/3197; G02B 26/06; G02B 27/1046; G03H 1/2294
See application file for complete search history.

(56) References Cited

U.S. PATENT DOCUMENTS

| 6,011,874 A | 1/2000 | Glueckstad |
| 6,243,156 B1 | 6/2001 | Weisgerber |

(Continued)

FOREIGN PATENT DOCUMENTS

| CN | 103217818 | 7/2013 |
| ES | 2604684 B2 | 1/2018 |

(Continued)

OTHER PUBLICATIONS

Huang, Y. et al "Fast-Response Liquid Crystal Phase Modulators for Augmented Reality Displays" vol. 25, No. 26, Dec. 25, 2017, pp. 32757-32766.
(Continued)

*Primary Examiner* — Magda Cruz

(57) ABSTRACT

A novel projection system includes a light source, a phase modulator, an amplitude modulator, and a controller having temporal lightfield simulation capabilities. The phase modulator spatially modulates a lightfield from the light source to generate an intermediate image on the amplitude modulator. The amplitude modulator spatially modulates the interme-
(Continued)

diate image to form a final image. The controller models the phase state of the phase modulator during transitions between phase modulator frames and generates lightfield simulations of the intermediate image during the transition. The controller utilizes the lightfield simulations to generate and provide sets of amplitude drive values to the amplitude modulator at a faster rate than that at which the phase modulator is capable of switching.

20 Claims, 21 Drawing Sheets

Related U.S. Application Data

(60) Provisional application No. 62/609,635, filed on Dec. 22, 2017.

(51) Int. Cl.
*G02B 26/06* (2006.01)
*G03H 1/22* (2006.01)
*H04N 5/74* (2006.01)

(52) U.S. Cl.
CPC ......... *G03H 1/2294* (2013.01); *H04N 5/7416* (2013.01); *H04N 9/3126* (2013.01); *H04N 9/3197* (2013.01); *G03H 2225/32* (2013.01)

(56) References Cited

U.S. PATENT DOCUMENTS

| | | | |
|---|---|---|---|
| 8,152,310 B2 | 4/2012 | Decusatis | |
| 8,444,275 B2 | 5/2013 | Kurtz | |
| 8,605,015 B2 | 12/2013 | Guttag | |
| 8,842,222 B2 | 9/2014 | Iversen | |
| 9,146,452 B2 | 9/2015 | Guthrie | |
| 9,232,172 B2 | 1/2016 | Perkins | |
| 9,319,648 B2 | 4/2016 | Jannard | |
| 9,848,176 B2 | 12/2017 | Damberg | |
| 9,874,319 B2 | 1/2018 | Minor | |
| 9,907,760 B2 | 3/2018 | Auriol | |
| 10,003,776 B2 | 6/2018 | Damberg | |
| 11,070,774 B2* | 7/2021 | Davies | H04N 9/3182 |
| 2005/0063032 A1 | 3/2005 | Igasaki | |
| 2008/0084510 A1* | 4/2008 | Toyooka | H04N 9/3155 |
| | | | 348/E9.027 |
| 2008/0150880 A1* | 6/2008 | Inuzuka | G09G 3/3611 |
| | | | 345/102 |
| 2008/0273044 A1 | 11/2008 | Govorkov | |
| 2009/0160877 A1* | 6/2009 | Peng | G09G 3/3426 |
| | | | 345/87 |
| 2010/0014134 A1 | 1/2010 | Cable | |
| 2010/0165429 A1* | 7/2010 | Buckley | G03H 1/2205 |
| | | | 359/9 |
| 2015/0109537 A1 | 4/2015 | Kompanets | |
| 2015/0323817 A1 | 11/2015 | Kim | |
| 2016/0381329 A1 | 12/2016 | Damberg | |
| 2017/0085846 A1* | 3/2017 | Damberg | H04N 9/3167 |
| 2018/0048873 A1 | 2/2018 | Damberg | |
| 2018/0176519 A1 | 6/2018 | Damberg | |
| 2018/0373129 A1 | 12/2018 | Pertierra | |
| 2020/0288093 A1 | 9/2020 | Pertierra | |
| 2020/0292921 A1 | 9/2020 | Pertierra | |

FOREIGN PATENT DOCUMENTS

| | | | | |
|---|---|---|---|---|
| GB | 2482066 A | * | 1/2012 | .......... G03H 1/2286 |
| GB | 2493517 B | | 6/2013 | |
| WO | 2017223100 | | 12/2017 | |

OTHER PUBLICATIONS

Kawakita, M. et al "High-Brightness Projection Display Using Spatial Light Modulators with Polymer-Dispersed Liquid Crystal" IEEE Transactions on Broadcasting, vol. 45, No. 2, Jun. 1999, pp. 225-233.

* cited by examiner $$
\begin{array}{|c|c|c|c|c|}
\hline
\varphi_{1,1}(t) & \varphi_{1,2}(t) & \varphi_{1,3}(t) & \cdots & \varphi_{1,m}(t) \\
\underline{602} & \underline{602} & \underline{602} & & \underline{602} \\
\hline
\varphi_{2,1}(t) & \varphi_{2,2}(t) & \varphi_{2,3}(t) & \cdots & \varphi_{2,m}(t) \\
\underline{602} & \underline{602} & \underline{602} & & \underline{602} \\
\hline
\varphi_{3,1}(t) & \varphi_{3,2}(t) & \varphi_{3,3}(t) & \cdots & \varphi_{3,m}(t) \\
\underline{602} & \underline{602} & \underline{602} & & \underline{602} \\
\hline
\vdots & \vdots & \vdots & \vdots & \vdots \\
\hline
\varphi_{n,1}(t) & \varphi_{n,2}(t) & \varphi_{n,3}(t) & \cdots & \varphi_{n,m}(t) \\
\underline{602} & \underline{602} & \underline{602} & & \underline{602} \\
\hline
\end{array}
$$

606 (columns), 604 (rows), 104

FIG. 6

TEMPORAL MODELING OF PHASE MODULATORS IN MULTI-MODULATION PROJECTION

CROSS-REFERENCE TO RELATED APPLICATIONS

This application is a Continuation of U.S. patent application Ser. No. 16/954,756, filed Jun. 17, 2020, which is the U.S. National Stage of International Application No. PCT/US2018/066080, filed Dec. 17, 2018, which claims the benefit of priority from U.S. Provisional Patent Application No. 62/609,635 filed Dec. 22, 2017 and European Patent Application No. 18166944.1 filed Apr. 12, 2018, which are hereby incorporated by reference in their entirety.

BACKGROUND

Field of the Invention

This invention relates generally to multiple-modulation projection systems, and more particularly to systems and methods for improving image quality in multiple-modulation projection systems.

Description of the Background Art

Multiple-modulation projection systems are known. Typical systems use two (or more) amplitude modulating spatial light modulators (SLMs) to produce high-dynamic range images. The first SLM, the pre-modulator, creates a low-resolution image on the second SLM, the primary modulator. The two images multiply optically to create very high contrast ratios. In dual modulation projection systems, dark areas of the image are realized by blocking light in both modulators. However, because some SLMs can only attenuate amplitude, the maximum brightness of a small image portion is the same as the maximum brightness of the full image (i.e. diffuse white).

Another method utilizes beam-steering rather than amplitude modulation to generate the low resolution image on the second SLM. Using a beam-steering SLM (e.g., a phase modulating SLM, tip-tilt mirror device, etc.) as the pre-modulator, light is steered to a location where greater intensity is needed, rather than being directed to a light dump. For example, if a small highlight area is required on a dark background, a beam-steering pre-modulator can steer the unused light from the dark background into the highlight area. Thus, highlighted areas may be displayed at a brighter intensity level than the diffuse white intensity level. Because most images only use high brightness in small areas, a beam-steering pre-modulator is useful for reducing cost (reducing the luminous flux requirement for the same effective peak brightness) and/or for improving the performance (e.g., dynamic range, color depth, etc.), thereby creating brighter and, hence, more compelling images.

However, beam-steering SLMs tend to switch at relatively slow frequencies as compared to most amplitude pre-modulators and primary modulators. They generally run at a lower frame rate than amplitude modulators, and they may change state relatively slowly between the images (i.e. spatial phase distributions) sent to them. Furthermore, because beam-steering SLMs use optical phase modulation and the resulting interference to steer light, the transition between two images might not represent a smooth crossfade between the two images arriving at the primary modulator.

Some dual-modulation systems use a light field simulation to model the image arriving on the primary modulator and determine how to drive the primary modulator to achieve a desired image. In a beam-steering system the light field simulation involves modeling the behavior of the light leaving the phase modulator. Because the physical image arriving at the primary modulator changes significantly between pre-modulator frames, and because the lightfield simulation is based on the phase image driving the pre-modulator (and the resulting complex interference patterns), the light field simulation during a transition is inaccurate and can cause visual artifacts.

SUMMARY

The invention is defined by the independent claims. The dependent claims define advantageous embodiments. The present invention overcomes the problems associated with the prior art by providing systems and methods for using temporal models of beam-steering (e.g., phase modulating) spatial light modulators (SLMs) to generate light field simulations. Aspects of the invention facilitate the generation of light field simulations at a higher frame rate than the rate at which phase modulation data is loaded into the beam-steering SLM. As a result, a primary modulator can be driven at a much higher data frame rate than the maximum frame rate of the beam-steering SLM.

An example method (e.g., in a projection system) includes driving a beam-steering spatial light modulator (SLM) with a first set of drive values to place the beam-steering SLM in a first state at a first time. The example method additionally includes driving the beam-steering SLM with a second set of drive values that cause the beam-steering SLM to transition from the first state of the beam-steering SLM to a second state of the beam-steering SLM at a second time. The transition of the beam-steering SLM from the first state to the second state is modeled, and the method additionally includes determining a third state of the beam-steering SLM at a third time, based at least in part on the model of the transition of the beam-steering SLM. The third time occurs between the first time and the second time. Then, a lightfield simulation is generated. The lightfield simulation is of a lightfield generated by the beam-steering SLM at the third time, based at least in part on the third state of the beam-steering SLM. Optionally, the example method additionally includes determining a plurality of states of the beam-steering SLM at a plurality of times based at least in part on the model of the transition of the beam-steering SLM, each of the plurality of times occurring between the first time and the second time.

The step of modeling the transition of the beam-steering SLM from the first state to the second state can be based on several factors. For example, the modeling of the transition of the beam-steering SLM can be based at least in part on an age of the beam-steering SLM. As another example, the step of modeling the transition of the beam-steering SLM from the first state to the second state can include modeling the transition of the beam-steering SLM based at least in part on the first state (and/or an even earlier state) and the second state of the beam-steering SLM. As another example, the step of modeling the transition of the beam-steering SLM from the first state to the second state can include modeling the transition of the beam-steering SLM based at least in part on physical characteristics of a liquid crystal layer of the beam-steering SLM. In yet another example method, the step of modeling the transition of the beam-steering SLM from the first state to the second state can include modeling the transition of the beam-steering SLM based at least in part on a temperature of the beam-steering SLM.

In a particular example method, the beam-steering SLM includes a plurality of pixels, and the step of modeling the transition of the beam-steering SLM from the first state to the second state includes modeling the transition of the beam-steering SLM on a pixel-by-pixel basis. In a more particular example method, the beam-steering SLM includes a plurality of pixels, and the step of modeling the transition of the beam-steering SLM from the first state to the second state includes modeling the transition of the beam-steering SLM based at least in part on crosstalk between pixels of the plurality of pixels.

The step of modeling the transition of the beam-steering SLM can also depend on the illumination field incident on the SLM. In an example method, the step of modeling the transition of the beam-steering SLM from the first state to the second state includes modeling the transition of the beam-steering SLM based at least in part on an intensity of a lightfield incident on the beam-steering SLM. In another example method, the step of modeling the transition of the beam-steering SLM from the first state to the second state includes modeling the transition of the beam-steering SLM based at least in part on a physical property of a lightfield incident on the beam-steering SLM. In yet another example method, the step of modeling the transition of the beam-steering SLM from the first state to the second state includes modeling the transition of the beam-steering SLM based at least in part on a total amount of light incident on the beam-steering SLM over a lifetime of the beam-steering SLM.

In another example method, the step of modeling a transition of the beam-steering SLM from the first state to the second state includes generating a transition function. The transition function is indicative of a relationship between time and a phase delay imparted on an incident lightfield by a pixel of the beam-steering SLM. Then, a value of the transition function at the third time is determined. Optionally, the step of determining a value of the transition function at the third time includes determining an average of the transition function over a time period including the third time.

Example controllers for controlling a projection system are also disclosed. An example controller includes a processing unit configured to execute code, an interface coupled to receive image data indicative of at least one image to be displayed, and memory electrically coupled to store data and the code. The data and the code include a beam-steering drive module. The beam-steering drive module is configured to drive a beam-steering spatial light modulator (SLM) with a first set of drive values to place the beam-steering SLM in a first state at a first time, and to drive the beam-steering SLM with a second set of drive values that cause the beam-steering SLM to transition from the first state of the beam-steering SLM to a second state of the beam-steering SLM at a second time. The data and the code additionally include a temporal lightfield simulation module configured to model the transition of the beam-steering SLM from the first state to the second state and to determine a third state of the beam-steering SLM at a third time based at least in part on the model of the transition of the beam-steering SLM. The third time occurs between the first time and the second time. The temporal lightfield simulation module is additionally configured to generate a lightfield simulation of a lightfield generated by the beam-steering SLM at the third time based at least in part on the third state of the beam-steering SLM. Optionally, the temporal lightfield simulation module is additionally configured to determine a plurality of states of the beam-steering SLM at a plurality of times based at least in part on the model of the transition of the beam-steering SLM, each of the plurality of times occurring between the first time and the second time.

In a particular example controller, the temporal lightfield simulation module can be configured to model the transition of the beam-steering SLM based at least in part on an age of the beam-steering SLM. Optionally, the temporal lightfield simulation module can be configured to model the transition of the beam-steering SLM based at least in part on the first state and the second state of the beam-steering SLM. The temporal lightfield simulation module can also be configured to model the transition of the beam-steering SLM based at least in part on physical characteristics of a liquid crystal layer of the beam-steering SLM. The temporal lightfield simulation module can also be configured to model the transition of the beam-steering SLM based at least in part on a temperature of the beam-steering SLM.

In a particular example controller, the beam-steering SLM includes a plurality of pixels, and the temporal lightfield simulation module is configured to model the transition of the beam-steering SLM on a pixel-by-pixel basis. In another particular example controller, the beam-steering SLM includes a plurality of pixels, and the temporal lightfield simulation module is configured to model the transition of the beam-steering SLM based at least in part on crosstalk between pixels of the plurality of pixels.

In a particular example controller, the temporal lightfield simulation module is configured to model the transition of the beam-steering SLM based at least in part on an intensity of a lightfield incident on the beam-steering SLM. The temporal lightfield simulation module can be configured to model the transition of the beam-steering SLM based at least in part on one or more other physical properties of a lightfield incident on the beam-steering SLM. As another example, the temporal lightfield simulation module can be configured to model the transition of the beam-steering SLM based at least in part on a total amount of light incident on the beam-steering SLM over a lifetime of the beam-steering SLM.

In another example controller, the temporal lightfield simulation module can be configured to generate a transition function and determine a value of the transition function at the third time. The transition function is indicative of a relationship between time and a phase delay imparted on an incident lightfield by a pixel of the beam-steering SLM. In a particular example controller, the temporal lightfield simulation module is configured to determine an average of the transition function during a time period including the third time.

Example methods for generating images (e.g., in a projection system) are also disclosed. One example method includes receiving a first frame of image data and generating a first set of phase drive values for driving a phase-modulating spatial light modulator (SLM). The first set of phase drive values is based at least in part on the first frame of image data. The method additionally includes driving the phase-modulating SLM with the first set of phase drive values during a first time period, receiving a second frame of image data, and generating a second set of phase drive values for driving the phase-modulating SLM. The second set of phase drive values is based at least in part on the second frame of image data. The example method additionally includes driving the phase-modulating SLM with the second set of phase drive values during a second time period and modeling transitional states of the phase-modulating SLM during the second time period. The transitional states are based at least in part on the first set of phase drive values and the second set of phase drive values. The example method additionally includes generating a set of lightfield simulations of lightfields generated by the phase-modulating SLM and incident on an amplitude-modulating SLM. A first subset of the set of lightfield simulations corresponds to the first set of phase drive values, a second subset of the set of lightfield simulations corresponds to the second set of phase drive values. A third subset of the set of lightfield simulations corresponds to one or more of the transitional states of the phase-modulating SLM. The example method additionally includes generating sets of amplitude drive values for driving the amplitude-modulating SLM and driving the amplitude-modulating SLM with the sets of amplitude drive values. Each of the sets of amplitude drive values corresponds to an associated one of the lightfield simulations.

In a particular example method, the first frame and the second frame are temporally sequential, and the third subset of lightfield simulations includes exactly one lightfield simulation. Alternatively, the third subset of lightfield simulations includes more than one lightfield simulation. As another alternative, the first frame and the second frame are not temporally sequential, and the third subset of lightfield simulations corresponds to at least one intervening frame temporally between the first frame and the second frame.

In a particular example method, the step of generating a second set of phase drive values includes utilizing the first set of phase drive values as an initial approximation of the second set of phase drive values and altering the initial approximation based on the third frame of image data.

In another particular example method, the phase-modulating SLM comprises a plurality of pixels, and the step of modeling transitional states of the phase-modulating SLM during the second time period includes modeling individual transitional states of individual pixels of the plurality of pixels. In a more particular method, the step of driving the phase-modulating SLM with the first set of phase drive values includes asserting a first set of voltages across the plurality of pixels, each voltage of the first set of voltages indicated by an associated value of the first set of phase drive values. The step of driving the phase-modulating SLM with the second set of phase drive values includes asserting a second set of voltages across the plurality of pixels, each voltage of the second set of voltages indicated by an associated value of the second set of phase drive values. The step of modeling individual transitional states of the plurality of pixels includes determining an individual transition of each pixel of the plurality of pixels from a corresponding voltage of the first set of voltages to a corresponding voltage of the second set of voltages. In an even more particular example method, the step of modeling transitional states of the phase-modulating SLM includes determining a transitional state of each pixel of the plurality of pixels at a particular time during the individual transition of each pixel. Alternatively, the step of modeling transitional states of the phase-modulating SLM can include determining an average state of each of pixel of the plurality of pixels over a period of time during the individual transition of each the pixel.

The step of modeling transitional states of the phase-modulating SLM can include modeling transitional states of the phase-modulating SLM based at least in part on a physical characteristic of the phase-modulating SLM. The step of modeling transitional states of the phase-modulating SLM can also include modeling transitional states of the phase-modulating SLM based at least in part on a physical characteristic of a liquid crystal layer of the phase-modulating SLM.

The step of modeling transitional states of the phase-modulating SLM can also include modeling transitional states of the phase-modulating SLM based at least in part on a physical characteristic of a lightfield incident on the phase-modulating SLM. The step of modeling transitional states of the phase-modulating SLM based at least in part on a physical characteristic of a lightfield incident on the phase-modulating SLM can include modeling transitional states of the phase modulating SLM based at least in part on a history of the lightfield.

In a particular example method, the step of generating a set of lightfield simulations includes modeling each of a plurality of pixels of the phase-modulating SLM as a source of spherical waves having a phase delay determined at least in part based on a corresponding one of the transitional states. Alternatively, the step of generating a set of lightfield simulations can include modeling each of a plurality of pixels of the phase-modulating SLM as an origin point of a light ray having an angle with respect to a surface of the phase-modulating SLM. The angle is determined at least in part based on a corresponding one of the transitional states.

Example controllers for controlling a projection system are also disclosed. One example controller includes a processing unit configured to execute code, an interface coupled to receive a first frame of image data, a second frame of image data, and a third frame of image data, and memory electrically coupled to store data and the code. The data and the code include a phase drive module, a temporal lightfield simulation module, and an amplitude drive module.

The phase drive module is configured to generate a first set of phase drive values for driving a phase-modulating spatial light modulator (SLM). The first set of phase drive values is based at least in part on the first frame of image data. The phase drive module is also configured to generate a second set of phase drive values for driving the phase-modulating SLM. The second set of phase drive values is based at least in part on the second frame of image data. The phase drive module is also configured to drive the phase-modulating SLM with the first set of phase drive values during a first time period and drive the phase-modulating SLM with the second set of phase drive values during a second time period.

The temporal lightfield simulation module is configured to model transitional states of the phase-modulating SLM during the second time period. The transitional states are based at least in part on the first phase drive values and the second phase drive values. The temporal lightfield simulation module is also configured to generate a set of lightfield simulations of lightfields generated by the phase-modulating SLM and incident on an amplitude-modulating SLM. A first subset of the set of lightfield simulations corresponds to the first set of phase drive values, a second subset of the set of lightfield simulations corresponds to the second set of phase drive values, and a third subset of the set of lightfield simulations corresponds to one or more of the transitional states of the phase-modulating SLM.

The amplitude drive module is configured to generate sets of amplitude drive values for driving the amplitude-modulating SLM. Each of the sets of amplitude drive values corresponds to one lightfield simulation of the set of lightfield simulations. The amplitude drive module is additionally configured to drive the amplitude SLM with the sets of amplitude drive values.

In a particular example controller, the first frame and the second frame are temporally sequential, and the third subset of lightfield simulations includes exactly one lightfield simulation. Alternatively, the third subset of lightfield simulations includes more than one lightfield simulation. As another alternative, the first frame and the second frame are not temporally sequential, and the third subset of lightfield simulations corresponds to at least one intervening frame temporally between the first frame and the second frame.

In a particular example controller, the phase drive module is configured to utilize the first set of phase drive values as an initial approximation of the second set of phase drive values when generating the second set of phase drive values. The phase drive module is further configured to alter the initial approximation of the second set of phase drive values based on the third frame of image data.

In another particular example controller, the phase-modulating SLM comprises a plurality of pixels, and the temporal lightfield simulation module is configured to model individual transitional states of pixels of the plurality of pixels. The phase drive module is configured to assert a first set of voltages across the plurality of pixels. Each voltage of the first set of voltages is based on the first set of phase drive values. The phase drive module is also configured to assert a second set of voltages across the plurality of pixels. Each voltage of the second set of voltages is based on the second set of phase drive values. The temporal lightfield simulation module is configured to determine an individual transition of each pixel of the plurality of pixels from a corresponding voltage of the first set of voltages to a corresponding voltage of the second set of voltages. The temporal lightfield simulation module can be configured to determine a transitional state of each pixel of the plurality of pixels at a particular time during the individual transition. Alternatively, the temporal lightfield simulation module can configured to determine an average transitional state of each of the plurality of pixels over a period of time during the individual transition.

In an example controller, the temporal lightfield simulation module is configured to model transitional states of the phase-modulating SLM based at least in part on a physical characteristic of the phase-modulating SLM. For example, the temporal lightfield simulation module can be configured to model transitional states of the phase-modulating SLM based at least in part on a physical characteristic of a liquid crystal layer of the phase-modulating SLM. As another option, the temporal lightfield simulation module can be configured to model transitional states of the phase-modulating SLM based at least in part on a characteristic (e.g., intensity, wavelength, bandwidth, etc.) of a lightfield incident on the phase-modulating SLM. For example, the temporal lightfield simulation module is configured to model transitional states of the phase modulating SLM based at least in part on a history of the lightfield.

In a particular example controller, the temporal lightfield simulation module models each pixel of a plurality of pixels of the phase-modulating SLM as a source of spherical waves having a phase delay determined at least in part by a corresponding one of the transitional states. In another particular example controller, the temporal lightfield simulation module models each pixel of a plurality of pixels of the phase-modulating SLM as an origin point of a light ray having an angle with respect to a surface of the phase-modulating SLM. The angle is determined at least in part by a corresponding one of the transitional states.

Another example method for generating images (e.g., in a projection system) is disclosed. The example method includes receiving (n) frames of image data. The example method additionally includes generating (m) frames of phase drive values. Each frame of phase drive values is based at least in part on an associated frame of the image data. Each frame of phase drive values also causes a phase-modulating spatial light modulator (SLM) to be in an associated phase state to generate a lightfield corresponding to the associated frame of image data. The example method additionally includes determining (p) transitional phase states (where p>0) of the phase-modulating SLM. Each of the transitional phase states is indicative of a lightfield generated by the phase-modulating SLM during a transition between sequential ones of the phase states associated with the phase drive values. The example method additionally includes generating a set of lightfield simulations based on the phase drive values and the transitional phase states. Each of the lightfield simulations is indicative of a lightfield generated by the phase-modulating SLM and incident on an amplitude-modulating SLM. The example method further includes generating a set of frames of amplitude drive values based on the set of lightfield simulations and the frames of image data.

In one example method, the number of frames of phase drive values (m) plus the number of determined transitional states (p) is equal to the number of frames of image data (n) (i.e., m+p=n). One lightfield simulation is generated for each frame of image data, and each light simulation is based on either a frame of phase drive values or a transitional phase state. In a particular example method, the number of frames of phase drive data (m) is equal to the number of determined transitional phase states (p) (i.e., m/p=1). Optionally, there can be more than one determined transitional phase state interleaved between consecutive frames of phase drive values (i.e., m/p<1).

In another example method, the number of frames of phase drive values (m) is equal to the number of frames of image data (n) (i.e., m=n). Optionally, the number of determined transitional phase states (p) is equal to the number of frames of image data (n) (i.e., p=n). The number of determined transitional phase states (p) can be greater than the number of frames of phase drive values (m) (i.e., p/m>1). In a particular example method, there are exactly three determined transitional phase states (p) for each frame of phase drive values (m) (i.e., p/m=3).

Example non-transitory, computer-readable media are also disclosed. One example non-transitory, computer-readable medium has code embodied therein for causing a projection system to receive (n) frames of image data. The code additionally causes the projection system to generate (m) frames of phase drive values where m<n. Each frame of phase drive values is based at least in part on an associated frame of the image data and causes a phase-modulating spatial light modulator (SLM) to be in an associated phase state to generate a lightfield corresponding to one of the frames of image data. The code additionally causes the projection system to determine (p) transitional phase states of the phase-modulating SLM, where p>0. Each of the transitional phase states is indicative of a lightfield generated by the phase-modulating SLM during a transition between sequential ones of the phase states associated with the phase drive values. The code additionally causes a projection system to generate a set of lightfield simulations based on the phase drive values and the transitional phase states, each of the lightfield simulations is indicative of a lightfield generated by the phase-modulating SLM and incident on an amplitude-modulating SLM. The code additionally causes a projection system to generate a set of frames of amplitude drive values based on the set of lightfield simulations and the set of frames of image data.

Indeed, any of the methods disclosed herein may be implemented with a transitory or non-transitory, electronically-readable medium having code embodied therein that, when executed, will cause an electronic device to perform the disclosed method. Examples, of non-transitory electronically readable media include, but are not limited to, volatile memory, non-volatile memory, hardware, software, firmware, and/or any combination of the foregoing examples.

Another example projection system includes a beam-steering spatial light modulator (SLM) configured to be driven with a first set of beam-steering drive values at a first time and a second set of beam-steering drive values at a second time. The first set of beam-steering drive values causes the beam-steering SLM to be in a first state, and the second set of beam-steering drive values causes the beam-steering SLM to be in a second state. The example projection system additionally includes means for modeling a transition of the beam-steering SLM from the first state to the second state and determining a third state of the beam-steering SLM at a third time based at least in part on the model of the transition of the beam-steering SLM. The third time occurs between the first time and the second time. The example projection system further includes a lightfield simulator configured to generate a lightfield simulation of a lightfield generated by the beam-steering SLM at the third time based at least in part on the third state of the beam-steering SLM.

BRIEF DESCRIPTION OF THE DRAWINGS

The present invention is described with reference to the following drawings, wherein like reference numbers denote substantially similar elements:

FIG. 6 is a block diagram illustrating a transitional phase state of the phase modulator of FIG. 1;

DETAILED DESCRIPTION

The present invention overcomes problems associated with the prior art, by providing a system and method for generating lightfield simulations of lightfields produced by a phase-modulating SLM during transition periods. In the following description, numerous specific details are set forth (e.g., switching frequencies of modulators) in order to provide a thorough understanding of the invention. Those skilled in the art will recognize, however, that the invention may be practiced apart from these specific details. In other instances, details of well-known projection practices (e.g., data manipulation, routine optimization, etc.) and components have been omitted, so as not to unnecessarily obscure the present invention.

Figure 1:
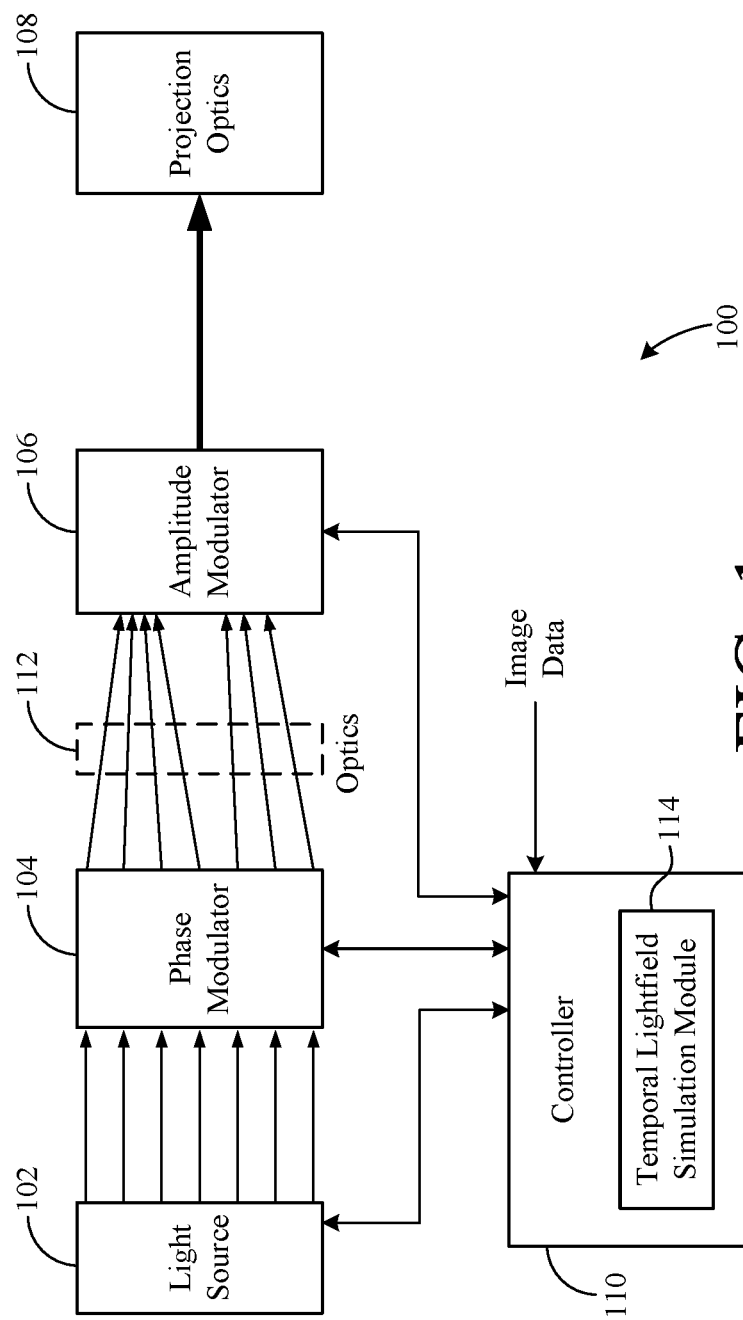
FIG. 1 is a block diagram of an example dual-modulation projection system.

FIG. 1 is a block diagram of a dual-modulation projection system 100. Projection system 100 generates high quality images from image data and includes a light source 102, a phase modulator 104, an amplitude modulator 106, projection optics 108, and a controller 110. Light source 102 shines a flat lightfield onto phase modulator 104. Phase modulator 104 is an analog liquid crystal phase modulator that selectively steers (i.e. spatially modulates the phase of) portions of the light comprising the flat lightfield through a set of intermediate optics 112 and onto amplitude modulator 106, to form an intermediate image on the surface of amplitude modulator 106. Phase modulator 104 could be a digital modulator, but analog modulators provide certain advantages, at least in this application, over digital modulators. Amplitude modulator 106 spatially modulates the intermediate image to form a final image, which is directed toward projection optics 108. Projection optics 108 includes a set of lenses, prisms, and/or mirrors, which direct the final image toward a display screen or other surface (not shown) to be viewed by an audience.

Controller 110 controls and coordinates the other elements of projection system 100, based on image data received from a data source (not shown). Controller 110 provides control instructions to light source 102, phase modulator 104, and amplitude modulator 106, based at least in part on the received image data. The control instructions include, for example, phase drive values and amplitude drive values sent to phase modulator 104 and amplitude modulator 106, respectively. Each phase drive value is a digital value corresponding to a voltage to be applied to a corresponding pixel of phase modulator 104, in order to cause that pixel to impart a particular phase delay (e.g. π radians) on light that is incident on it. Each amplitude drive value is a multi-bit value corresponding to a time-averaged voltage (e.g., pulse width modulation) to be applied to a corresponding pixel of amplitude modulator 106, in order to cause that pixel to impart a particular amplitude change (e.g., a grayscale level) to light incident on it. A set of phase drive values or amplitude drive values is a plurality of phase drive values or amplitude drive values, each corresponding to a pixel of phase modulator 104 or amplitude modulator 106, respectively, and being represented by a matrix having the same resolution as phase modulator 104 or amplitude modulator 106. One set of control instructions, having a drive value for each pixel of a modulator, is typically referred to as a frame of control/image data. These control instructions drive phase modulator 104 and amplitude modulator 106 in order to generate the intermediate and final images.

Controller 110 includes a temporal lightfield simulation module 114, which is discussed in detail below, to model phase states of phase modulator 104 and to generate lightfield simulations of the intermediate image, based on the modelled phase states. The phase states of phase modulator 104 are collections of the physical phase delays imparted by each pixel of phase modulator 104 at a particular time, represented by a matrix having the same resolution as phase modulator 104. Because phase modulator 104 is an analog device, each phase drive value corresponds to a particular phase delay, but each phase delay does not necessarily correspond to a particular phase drive value. Alternatively, phase modulator 104 can be a digital device.

In the example embodiment, light source 102 is a low-etendue light source including an array of tunable lasers. In alternate embodiments, light source 102 can be replaced by an array of light-emitting diodes (LEDs), a dimmable bulb, or any other suitable light source, including those now known or yet to be invented, in combination with suitable optics to provide a low-etendue lightsource. Additionally, phase modulator 104 and amplitude modulator 106 can be liquid crystal phase and amplitude spatial light modulators (SLMs), respectively. In alternate embodiments, amplitude modulator 106 can be a digital micro-mirror device (DMD), a reflective liquid-crystal-on-silicon (LCOS) device, or any other suitable amplitude modulating device, including those now known or yet to be invented.

In the description of example embodiments phase modulator 104 and amplitude modulator 106 are thus named to distinguish between an SLM that is used to steer light to create a lightfield on a primary modulator (phase modulator 104) and an SLM that modulates selected portions of the lightfield to create an image for viewing (amplitude modulator 106). However, these terms are not used in a limiting sense. For example, DMDs selectively steer light along or out of an optical path, but are used as amplitude modulators by time multiplexing the amount of light steered into or out of an image to create an intermediate gray level (perceived amplitude modulation). As another example, liquid crystal SLMs selectively alter the phase of light and can, therefore, be considered phase modulating or beam-steering devices. However, the birefringent property of liquid crystals also results in polarization rotation, and so liquid crystal SLMs can be used with internal or external polarizers to provide amplitude modulation. Therefore, devices referred to as "amplitude modulators", "phase modulators", or "beam-steering modulators" are understood to include any device capable of performing the titled function, either alone or in combination with other devices. Furthermore, although phase modulator 104 and amplitude modulator 106 appear as transmissive devices in FIG. 1, phase modulator 104 and amplitude modulator 106 could also be, and more likely would be, reflective devices.

Figure 2A:
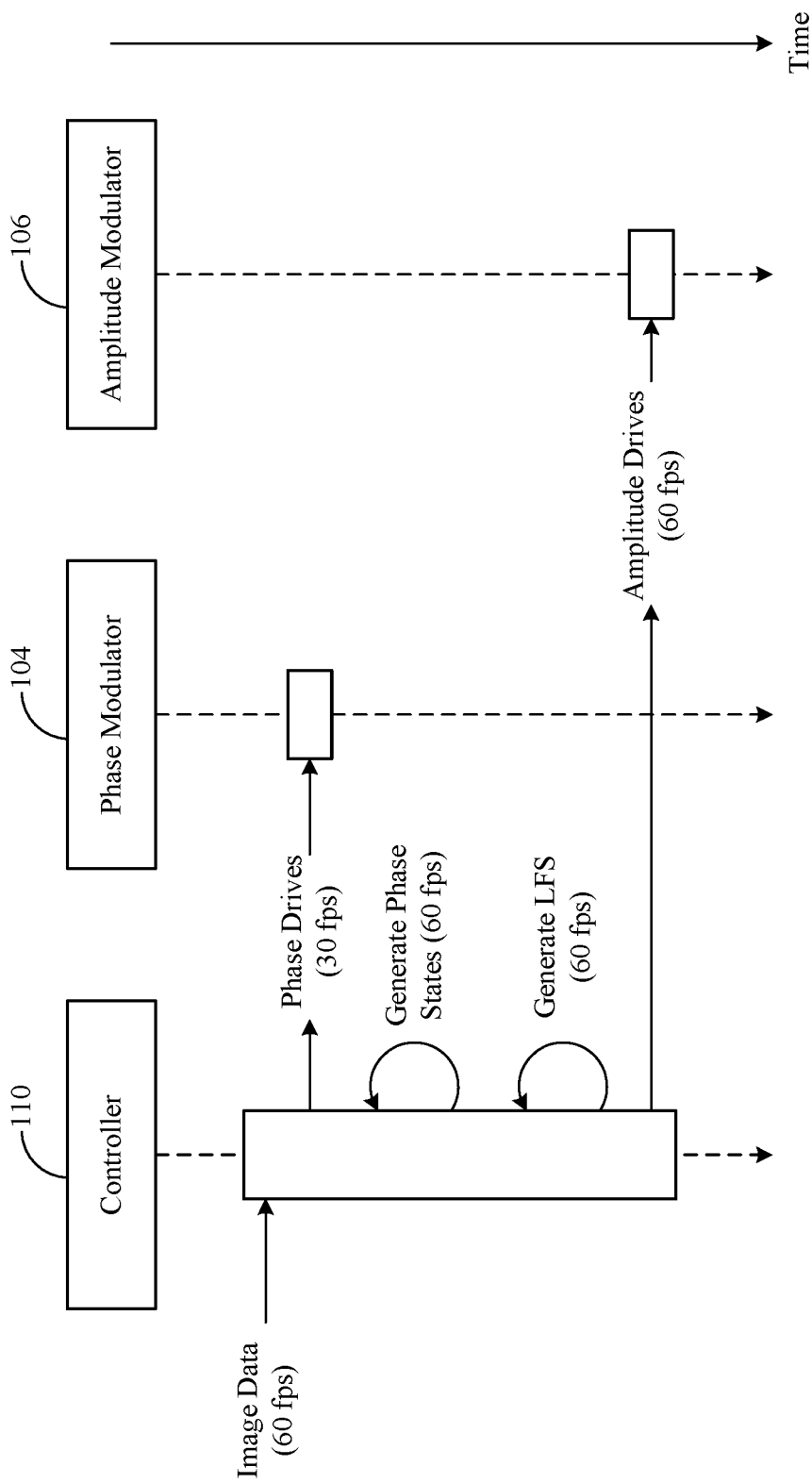
FIG. 2A is a timing diagram, illustrating an example method for generating images in the projection system of FIG. 1.

FIG. 2A is a timing diagram, illustrating an example method for generating images in projection system 100. First, controller 110 receives image data at a rate of 60 frames per second (fps). Then controller 110 uses half of the frames of image data (e.g., every other frame) to generate sets of phase drive values at a decreased rate (30 fps in the example embodiment), because phase modulator 104 is incapable of switching fast enough to receive sets of phase drive values at the same rate the image data is received. Controller 110 sends the sets of phase drive values to phase modulator 104 to cause phase modulator 104 to produce intermediate images on amplitude modulator 106 (FIG. 1). Next, controller 110 models phase states of phase modulator 104 at a rate of 60 fps, based, at least in part, on the phase drive values. As used herein, the term "modeling" includes determining a particular phase state based on an existing model of a response of the pixels of phase modulator 104. Half of the phase states, referred to as steady phase states, are indicative of the spatial phase delay distribution on phase modulator 104 while it is driven by the phase drive values at steady state (i.e. after all the pixels of phase modulator 104 have fully responded to the applied voltages indicated by the phase drive values). The other half of the phase states, referred to as transitional phase states, are indicative of the spatial phase delay distribution on phase modulator 104 at a time when it is transitioning between one set of phase drive values and the next (e.g., between consecutive steady states). Effectively, controller 110 converts the sets of phase drive values to steady phase states and temporally up-samples the phase states by generating additional transitional phase states at a rate of 30 fps, based on a transition of phase modulator 104 between consecutive steady phase states, in order to generate a phase state for each frame of image data (60 fps). Next, controller 110 utilizes the phase states to generate lightfield simulations of the intermediate image generated by phase modulator 104 and incident on amplitude modulator 106 at a rate of 60 fps. Because the phase states indicate how phase modulator 104 will modulate an incident lightfield, they can be used to reliably estimate the resulting intermediate image (i.e., the lightfield incident on amplitude modulator 106). Finally, controller 110 utilizes the lightfield simulations to generate sets of amplitude drive values for driving amplitude modulator 106, at 60 fps, in order to generate a final image in accordance with the image data.

Figure 2B:
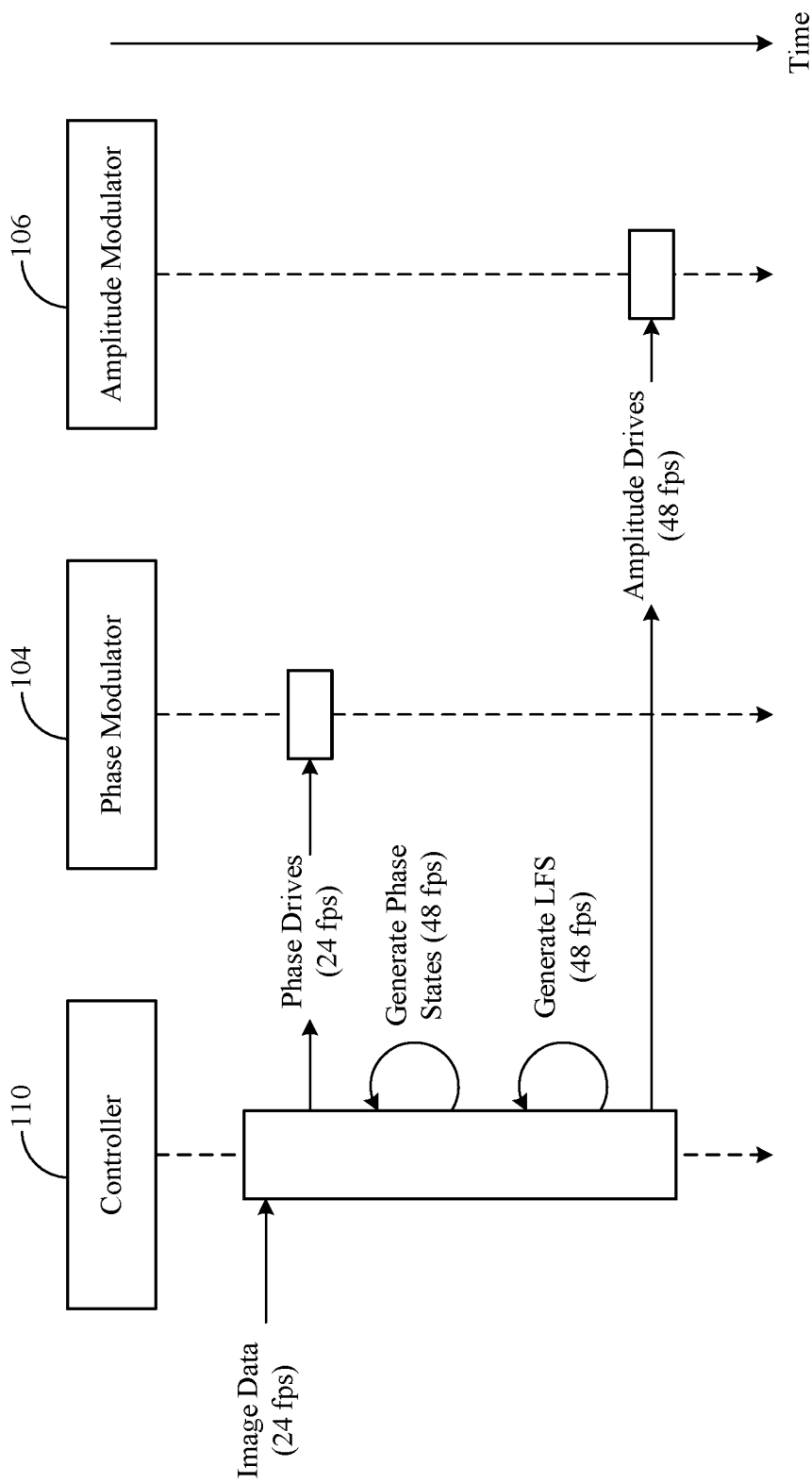
FIG. 2B is a timing diagram, illustrating another example method for generating images in the projection system of FIG. 1.

FIG. 2B is a timing diagram illustrating an alternative method for generating images in projection system 100. Controller 110 receives image data at a rate of 24 fps (the framerate used for nearly all cinematography), uses all the frames of image data to generate phase drive values at an equal rate (24 fps), and provides the phase drive values to phase modulator 104. Controller 110 also generates phase states from the phase drive values, but at an increased rate (48 fps in this example). Effectively, controller 110 converts the sets of phase drive values to steady phase states at a rate of 24 fps and temporally up-samples the phase states by generating additional transitional phase states at a rate of 24 fps, in order to generate two phase states for each frame of image data (48 fps). Next, controller 110 utilizes the phase states to generate lightfield simulations of the intermediate image generated by phase modulator 104 and incident on amplitude modulator 106 at a rate of 48 fps. Finally, controller 110 utilizes the lightfield simulations to generate sets of amplitude drive values for driving amplitude modulator 106 at 48 fps, in order to generate final images free of artifacts that might otherwise be caused by the transitions of phase modulator 104.

Figure 2C:
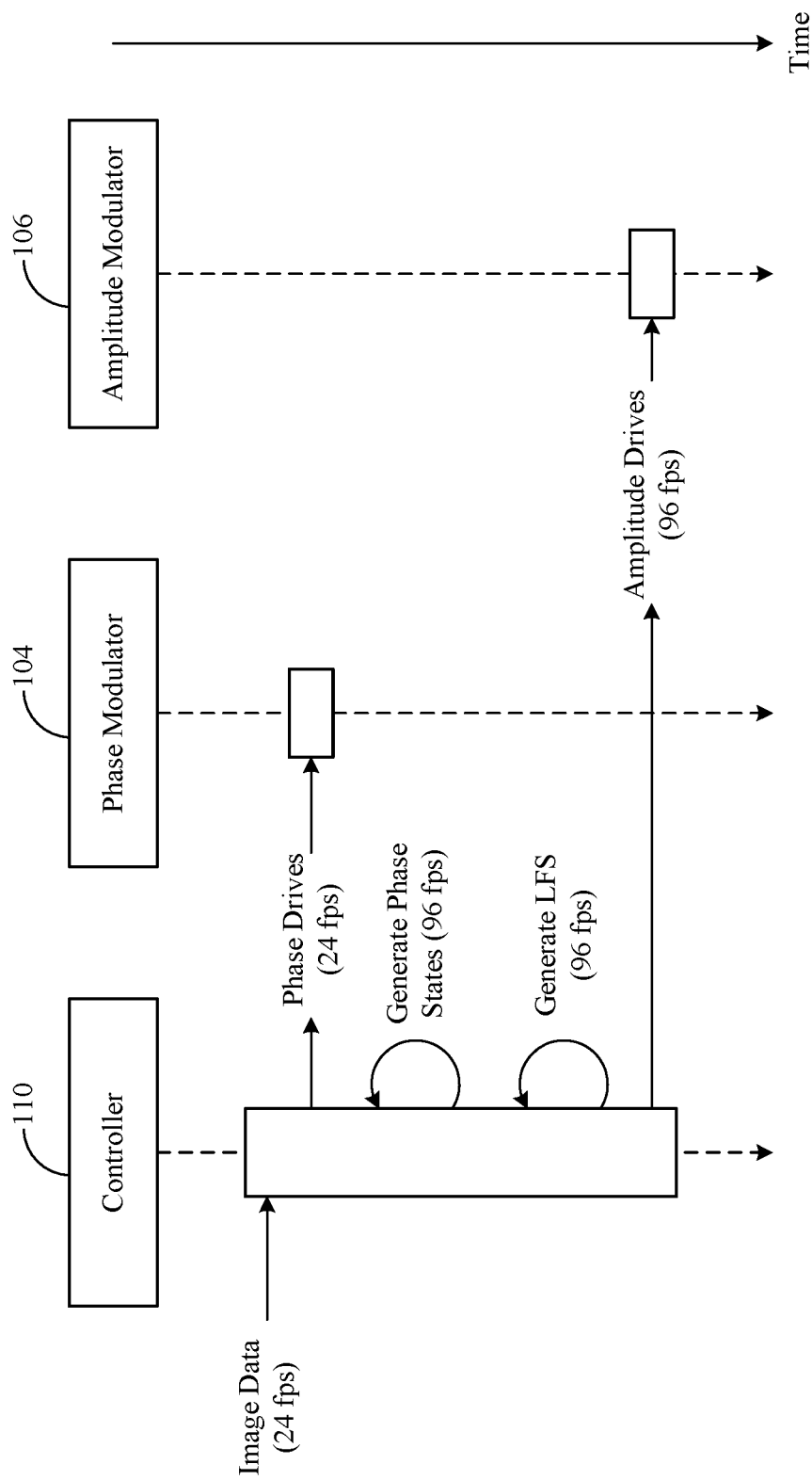
FIG. 2C is a timing diagram, illustrating yet another example method for generating images in the projection system of FIG. 1.

FIG. 2C is a timing diagram illustrating yet another alternative method for generating images in projection system 100. FIG. 2C is substantially similar to FIG. 2B, except that controller 110 generates four phase states (at a rate of 96 fps) for each frame of image data received. Controller 110 also generates lightfield simulations and sets of amplitude drive values at a rate of 96 fps, thereby providing increased image quality. An arbitrary number of phase states can be generated for each frame of image data. As both the switching frequency of SLMs and current computing technologies improve, the number of phase states can be increased indefinitely. Additionally, it may be desirable to generate phase states at a higher frequency than amplitude modulator 106 is capable of switching at. For example, in a system with an amplitude modulator capable of switching twice as fast as the phase modulator, it might be desirable to generate sets of phase drive values and phase states at a 1:4 ratio and to calculate an average of the transitional phase states when generating the lightfield simulations.

Figure 3:
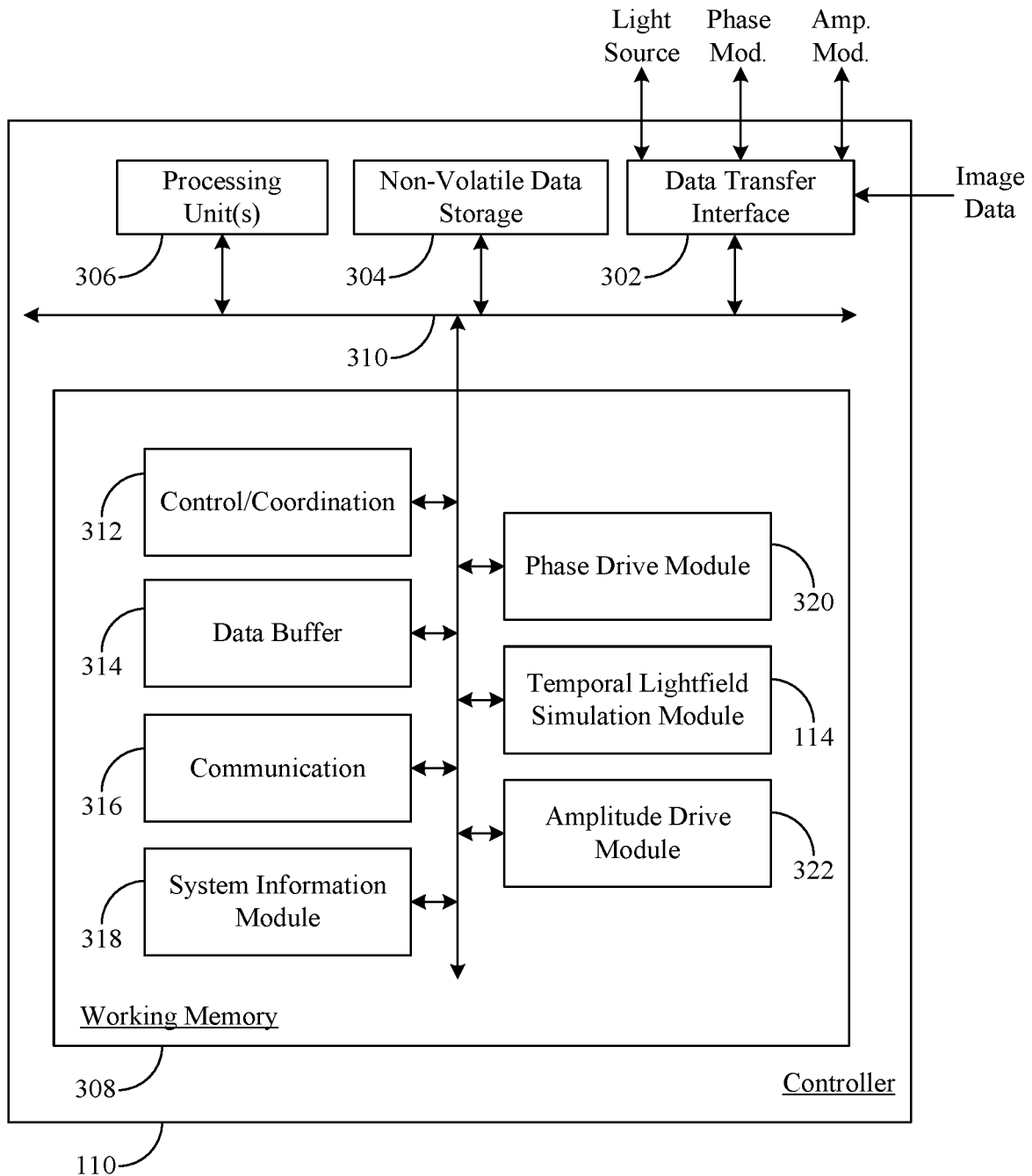
FIG. 3 is a block diagram showing the controller of FIG. 1 in greater detail.

FIG. 3 is a block diagram showing controller 110, including a data transfer interface 302, non-volatile data storage 304, one or more processing unit(s) 306, and working memory 308. The components of controller 110 communicate with one another via a system bus 310, which is interconnected between the components of controller 110. Data transfer interface 302 controls the transfer of data, including image data and control instructions, to and from controller 110. Non-volatile data storage 304 stores data and code and retains the data and code even when controller 110 is powered down. Processing unit(s) 306 impart(s) functionality to controller 110 by executing code stored in non-volatile data storage 304 and/or working memory 308.

Working memory 308 provides temporary storage for data and code. Some functionality of controller 110 is represented by data and code modules shown within working memory 308. The data and code modules are transferred (in whole or in part) into and out of working memory 308 from non-volatile data storage 304, as determined by the execution of code by processing unit(s) 306. The data and code modules can be implemented, for example, with any combination of hardware, software, and/or firmware.

Working memory 308 includes a control/coordination module 312, a data buffer 314, a communication module 316, system configuration settings 318, a phase drive module 320, temporal lightfield simulation module 114, and an amplitude drive module 322. Control/coordination module 312 is a higher level program that provides overall coordination and control of the other functional aspects of controller 110. Data buffer 314 temporarily stores data to be utilized by the other components of controller 110. Communication module 316 facilitates communication with external devices in order to send/receive code and/or control instructions. System information module 318 includes information about projection system 100 (e.g. optical set-up, age of components, technical specifications of components, etc.), which is utilized by the other components of controller 110. Phase drive module 320 includes data and algorithms for generating sets of phase drive values from image data. Temporal lightfield simulation module 114 includes data and algorithms for modeling the phase states of phase modulator 104 and generating lightfield simulations of the intermediate image produced by phase modulator 104, based on the phase states. Amplitude drive module 322 includes data and algorithms for generating sets of amplitude drive values from the image data and the lightfield simulations.

Figure 4A:
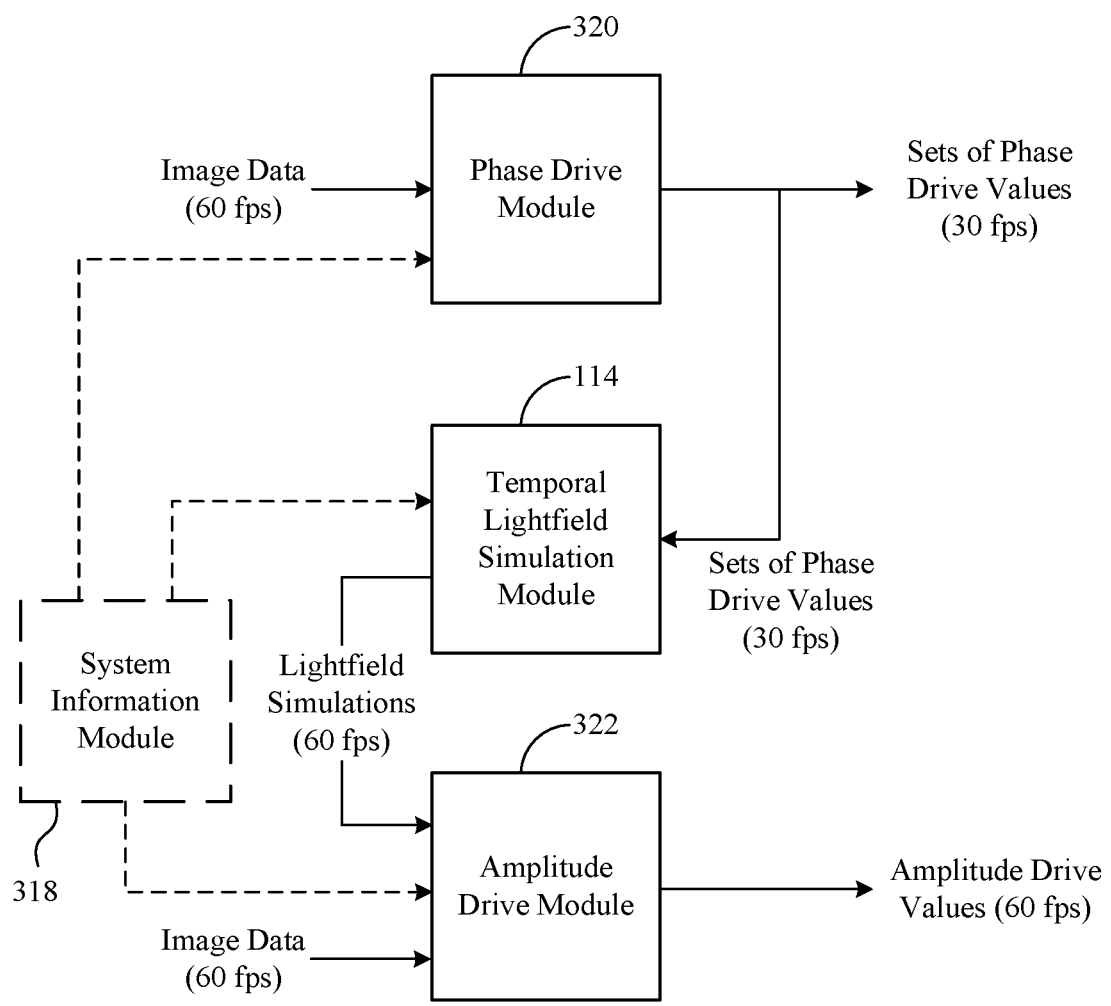
FIG. 4A is a block diagram illustrating example data flow between modules of the controller of FIG. 3 to drive other components of the projection system of FIG. 1.

FIG. 4A is a block diagram illustrating example data flow between some of the modules of the controller of FIG. 1. In this example embodiment, the modules shown in FIG. 4A are stored and executed within working memory 308 (FIG. 3) of controller 110. First, phase drive module 320 receives image data from data transfer interface 302 (FIG. 3). Using one (or more) of a variety of methods and/or algorithms, phase drive module 320 generates sets of phase drive values for driving phase modulator 104 (FIG. 1) based on the image data. The sets of phase drive values are provided to drive phase modulator 104, and also provided to temporal lightfield simulation module 114, to be utilized for generating phase states and simulations of the corresponding lightfields on amplitude modulator 106. Using one (or more) of a variety of methods and/or algorithms, lightfield simulation module 114 determines the phase states of phase drive module 104, based on the sets of phase drive values, and generates the corresponding lightfield simulations, based on the phase states. The lightfield simulations are provided directly to amplitude drive module 322. Amplitude drive module 322 uses one (or more) methods and/or algorithms to generate sets of amplitude drive values for driving amplitude modulator 106 based on the lightfield simulations and the image data. The sets of amplitude drive values are provided to drive amplitude modulator 106 via data transfer interface 302 (FIG. 3).

In the example embodiment, phase drive module 320, temporal lightfield simulation module 114, and amplitude drive module 322 each utilize relevant data from system information module 318. For example, temporal lightfield simulation module 114 can utilize information about phase modulator 104 from system information module 318 to model phase transitions of phase modulator 104 between consecutive steady phase states. Examples of relevant information about phase-modulator 104 include, but are not limited to, the age of phase-modulator 104, physical characteristics of a liquid crystal layer of phase modulator 104, the temperature of phase-modulator 104, voltage/phase delay transition curves, and so on. Phase drive module 320 and temporal lightfield simulation module 114 can also utilize data from system information module 318 describing the characteristics of optics 112 and/or light source 102, in order to simulate the lightfield generated by phase modulator 104. Examples of relevant information about optics 112 and/or light source 102 include, but are not limited to, physical characteristics (e.g., intensity, wavelength(s), etc.) of a lightfield incident on phase modulator 104, a history of the lightfield (e.g., total amount of incident light over lifetime of phase modulator 104), and so on. Lightfield simulation module 114 can also use information about phase modulator 104 in combination with the phase drive values to generate improved light field simulations. For example, based on particular set of phase drive values, lightfield simulation module can estimate the effect of cross-talk between neighboring pixels of phase modulator 104. Using any of the foregoing information, or combinations thereof, phase drive module 320, temporal lightfield simulation module 114, and amplitude drive module 322 are together able to generate beam-steering and amplitude drive values that produce higher quality images via projection system 100.

Figure 4B:
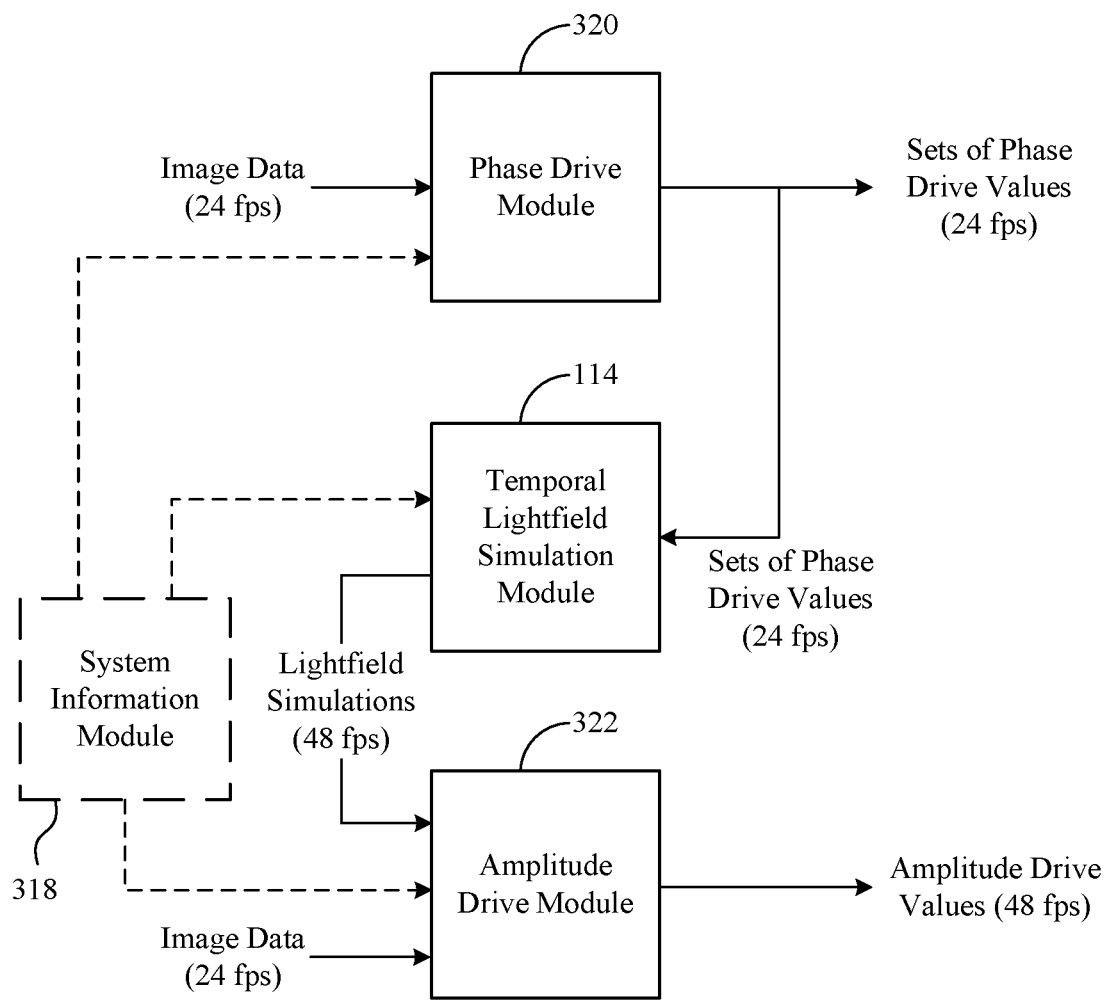
FIG. 4B is a block diagram illustrating another example data flow between modules of the controller of FIG. 3 to drive other components of the projection system of FIG. 1.

FIG. 4B is a block diagram illustrating data flow between some of the modules of controller 110, while operating according to the method described with reference to FIG. 2B above. Particularly, phase drive module 320 receives image data at a rate of 24 fps and outputs sets of phase drive values at a rate of 24 fps. The sets of phase drive values are received by temporal lightfield simulation module 114 and used to generate lightfield simulations at a rate of 48 fps (e.g. two lightfield simulations for each set of phase drive values). The lightfield simulations are received by amplitude drive module 322 along with the original frames of image data. Amplitude drive module 322 utilizes the lightfield simulations and the frames of image data to generate amplitude drive values at a rate of 48 fps.

Figure 4C:
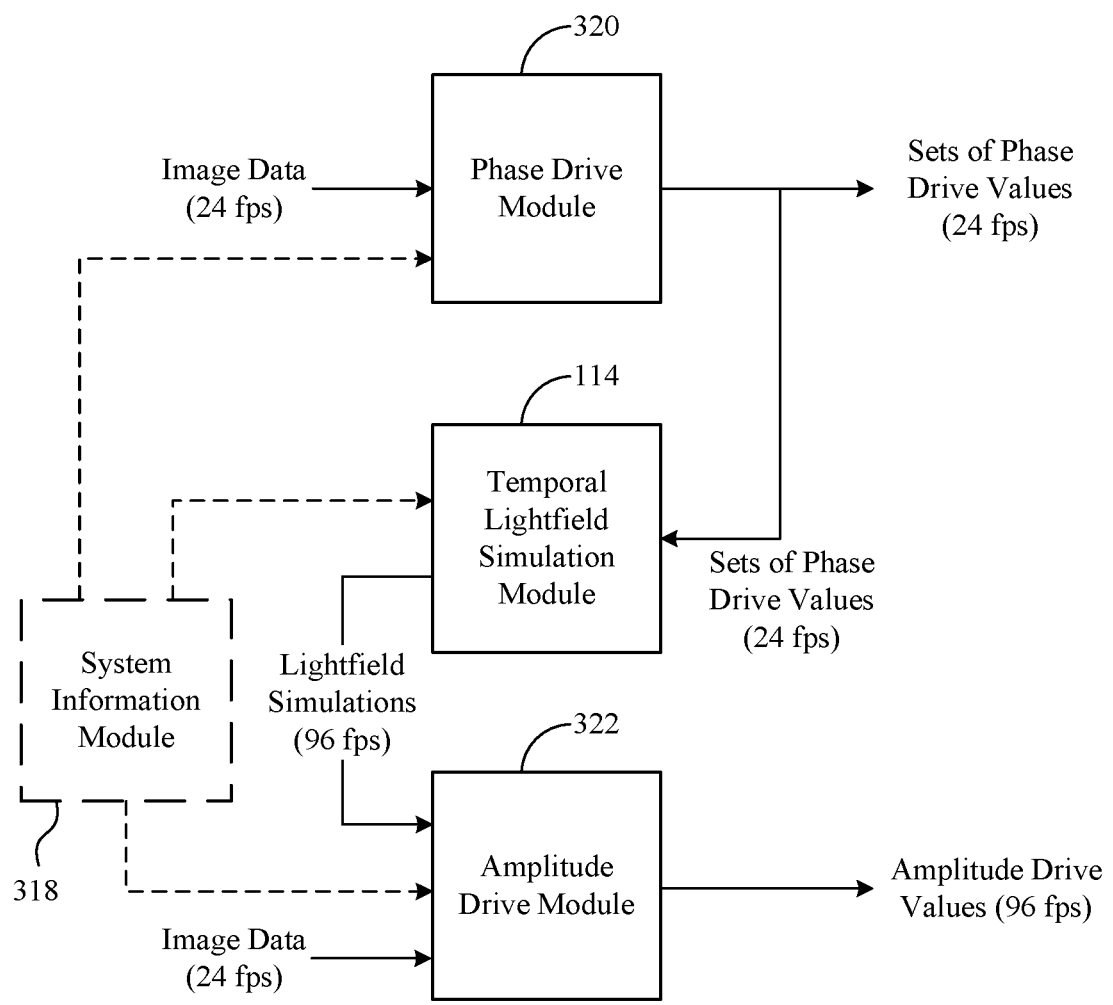
FIG. 4C is a block diagram illustrating yet another example data flow between modules of the controller of FIG. 3 to drive other components of the projection system of FIG. 1.

FIG. 4C is a block diagram illustrating data flow between some of the modules of controller 110, while operating according to the method described with reference to FIG. 2C above. Particularly, phase drive module 320 receives image data at a rate of 24 fps and outputs sets of phase drive values at a rate of 24 fps. The sets of phase drive values are received by temporal lightfield simulation module 114 and used to generate lightfield simulations at a rate of 96 fps (e.g. four lightfield simulations for each set of phase drive values). The lightfield simulations are received by amplitude drive module 322 along with the original frames of image data Amplitude drive module 322 utilizes the lightfield simulations and the frames of image data to generate amplitude drive values at a rate of 96 fps.

Figure 5A:
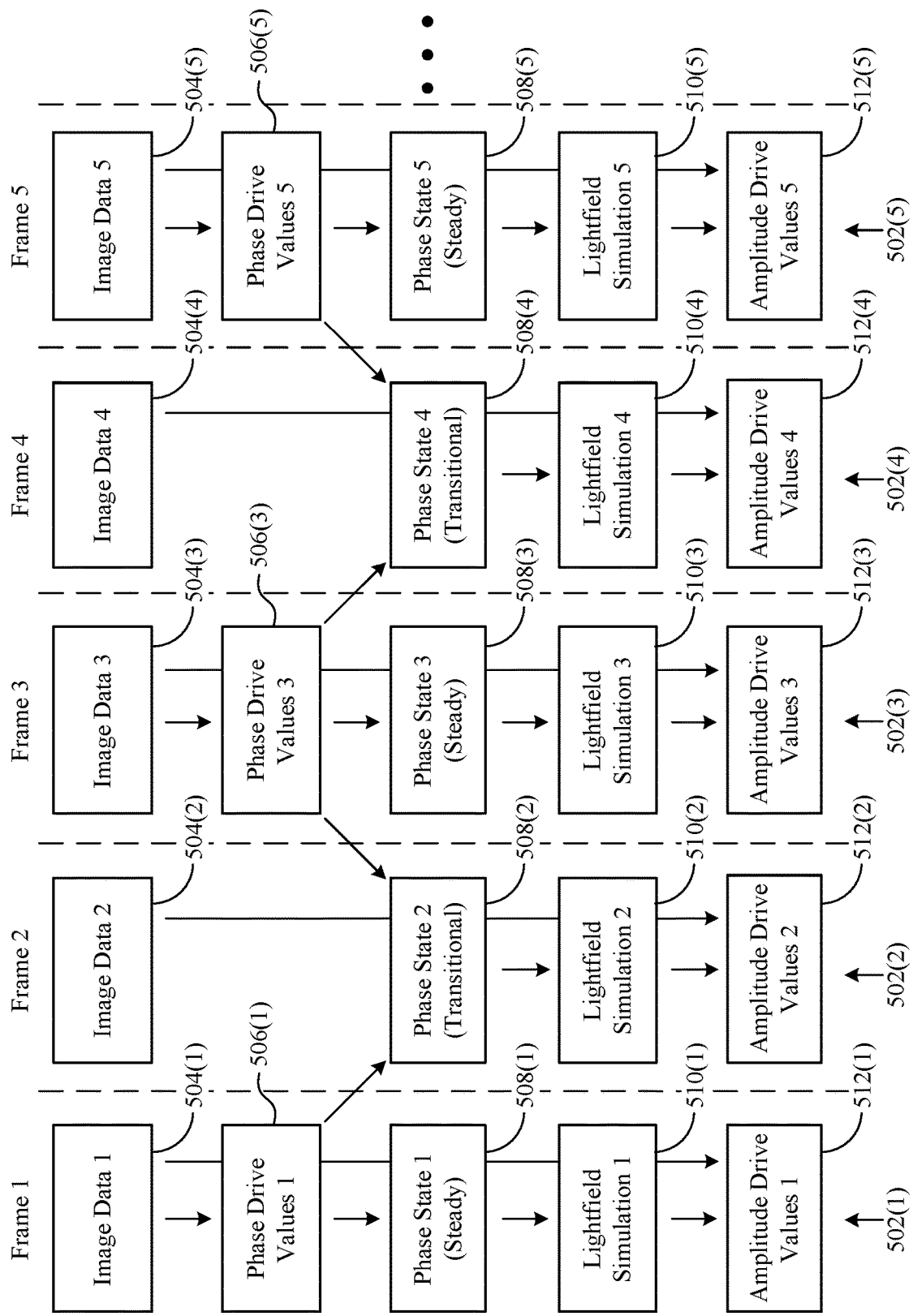
FIG. 5A is a diagram illustrating the generation of drive values, phase states, and lightfield simulations from image data.

FIG. 5A is a diagram illustrating the generation of drive values, phase states, and lightfield simulations corresponding to a plurality of frames of video data 502(1-5). As will become clear, the various drive values, phase states, and lightfield simulations are arranged under associated frames of image data to which they correspond for display purposes. However, FIG. 5A is not a timing diagram. Therefore, the drive values, phase states, and lightfield simulations are not necessarily generated during the frame time in which they are displayed in FIG. 5A. Time is, however, a factor used to determine intermediate phase states and, therefore, affects the lightfield simulations and amplitude drive values based on those intermediate phase states. For example, some transitional phase states, which are used to calculate a lightfield simulation for a particular frame of image data, can be determined based in part on one or more subsequently received frames of image data. An example of relative timing for generating these values will be explained below, with reference to FIG. 5B.

In a first frame column 502(1), a frame of image data 504(1) is received and utilized to generate a set of phase drive values 506(1). Phase drive values 506(1) are utilized to determine a steady phase state 508(1). Steady phase state 508(1) is utilized to generate a lightfield simulation 510(1), and lightfield simulation 510(1) is utilized, along with image data 504(1), to generate a set of amplitude drive values 512(1).

In a second frame column 502(2), a second frame of image data 504(2) is received, but phase drive values are not generated based on second frame of image data 504(2), because phase modulator 104 is incapable of switching at the relatively higher frequency of the image data receipt. Instead, a transitional phase state 508(2) is determined based on steady phase state 508(1) and a steady phase state 508(3) of a third frame column 502(3). Steady phase state 508(3) is determined the same way as steady phase state 508(1) (i.e. steady phase state 508(3) is generated from image data 504(3)). Transitional phase state 508(2) is indicative of the phase state of phase modulator 104 during a transition between being driven by phase drive values 506(1) and phase drive values 506(3).

All odd frame columns (e.g. frames 502(1), 502(3), 502(5), etc.) are similar, in that they include phase drive values 506. All even frame columns (e.g. frames 502(2), 502(4), etc.) are similar, in that they do not include phase drive values 506. Each of phase drive values 506 is utilized as an initial drive state (for the subsequent frame) and a final drive state (for the prior frame) for modeling the transition of phase modulator 104. This pattern continues over all frames of image data 504.

Figure 5B:
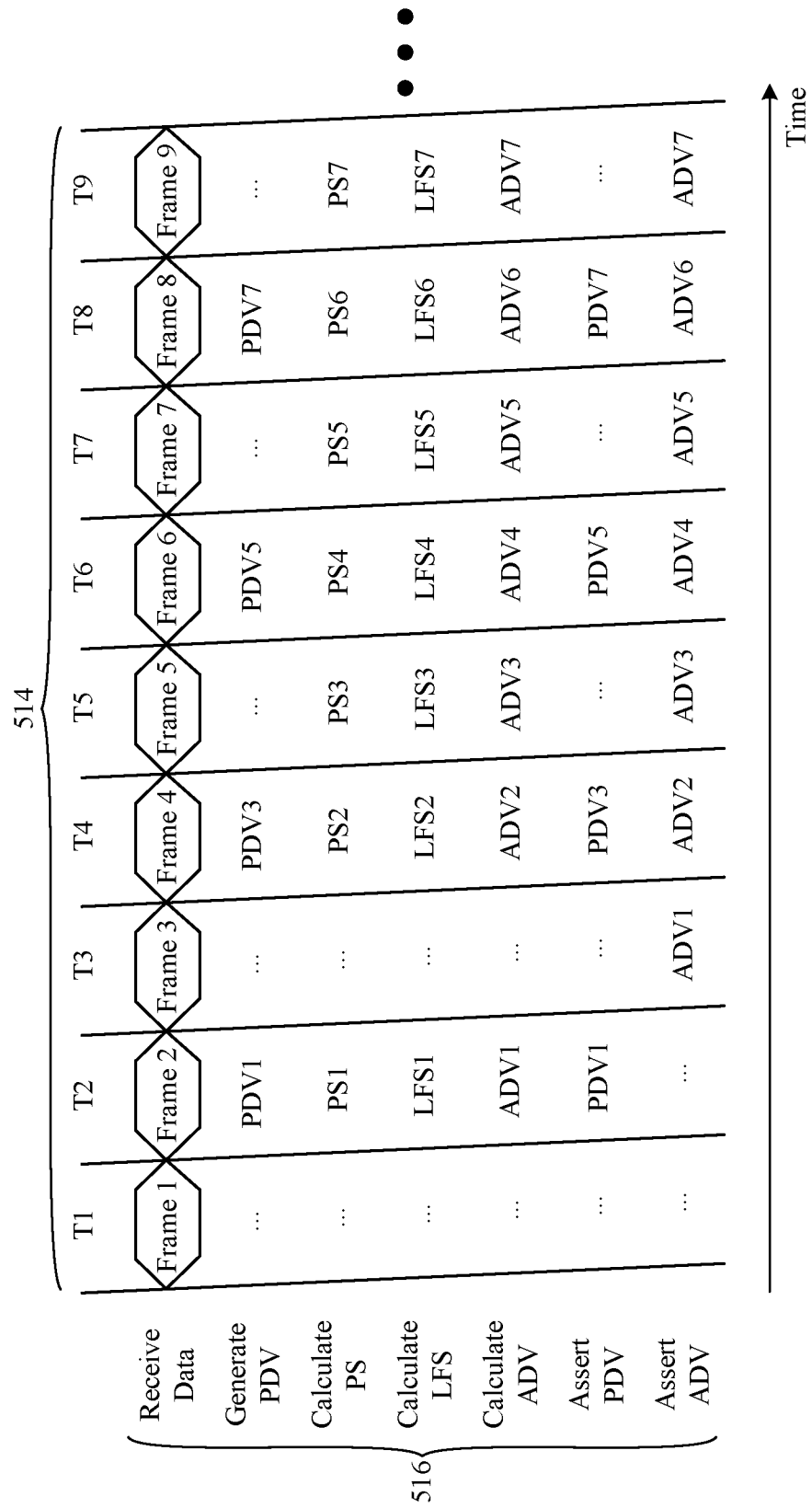
FIG. 5B is a timing diagram showing the relative timing of receiving image data and generating drive values, phase states, and lightfield simulations therefrom in an example system.

FIG. 5B is a timing diagram showing the relative timing of receiving image data and generating drive values, phase states, and lightfield simulations therefrom. For every other frame of image data, a set of phase drive values (labeled PDV) is generated. For every frame of image data, a phase state (labeled PS) of phase modulator 104 is calculated, a lightfield simulation (labeled LFS) is calculated, a set of amplitude drive values (labeled ADV) is calculated, the PDVs are asserted on phase modulator 104, and the ADVs are asserted on amplitude modulator 106. However, because the PDVs corresponding to a particular frame are required to calculate the PS of the prior frame, not all of these steps occur sequentially for a given frame.

FIG. 5B illustrates relative timing for performing each of the actions necessary for displaying images in projection system 100. Each of a plurality of columns 514 (labeled "T1", "T2", etc.) refers to a time period (e.g., a frame time). Each of a plurality of rows 516 (labeled "Receive Data", "Generate PDV", etc.) refers to an action executed (by controller 110, in the example embodiment) as part of displaying an image. During a first time period T1, a first frame of image data (Frame 1) is received. Then, during a second time period T2, a second frame of image data is received and PDV1, PS1, LFS1, and ADV1, which all correspond to Frame 1, are generated and/or calculated. During time period T2 (or at least by the beginning of T3), PDV1 is also asserted onto phase modulator 104. Because there is a delay between asserting phase drive values on phase modulator 104 and phase modulator 104 reaching steady state, ADV1 is not asserted onto amplitude modulator 106 until a third time period T3. Instead amplitude modulator 106 is driven with a zero-state. Alternatively, a transitional phase state can be calculated, based on an initial state of phase modulator 104 and PDV1, with ADV1 being calculated based on the transitional phase state and asserted during second time period T2.

Next, during a fourth time period T4, a fourth frame of image data is received, and PDV3, which corresponds to the image data of Frame 3, and PS2, LFS2, and ADV2, which all correspond to the image data of Frame 2, are generated. Because PS2 is determined by both PDV1 and PDV3, it can be generated after PDV3 is determined. Additionally, PDV3 is asserted on phase modulator 104, initiating a transition (modeled as part of determining PS2) between PS1 and PS3, and ADV2 (which corresponds to PS2 and LFS2) is asserted on amplitude modulator 106.

Then, during a fifth time period T5, a fifth frame of image data is received, PS3, LFS3, and ADV3 are generated, and ADV3 is asserted on amplitude modulator 106. The process of displaying images continues in this manner, with the generation of each phase state (and the corresponding lightfield simulation and set of amplitude drive values) lagging two time periods behind the receipt of the corresponding frame of image data. Additionally, the assertion of each set of amplitude drive values lags two time periods behind the receipt of the corresponding image data and one time period behind the assertion of the corresponding set of phase drive values.

Figure 5C:
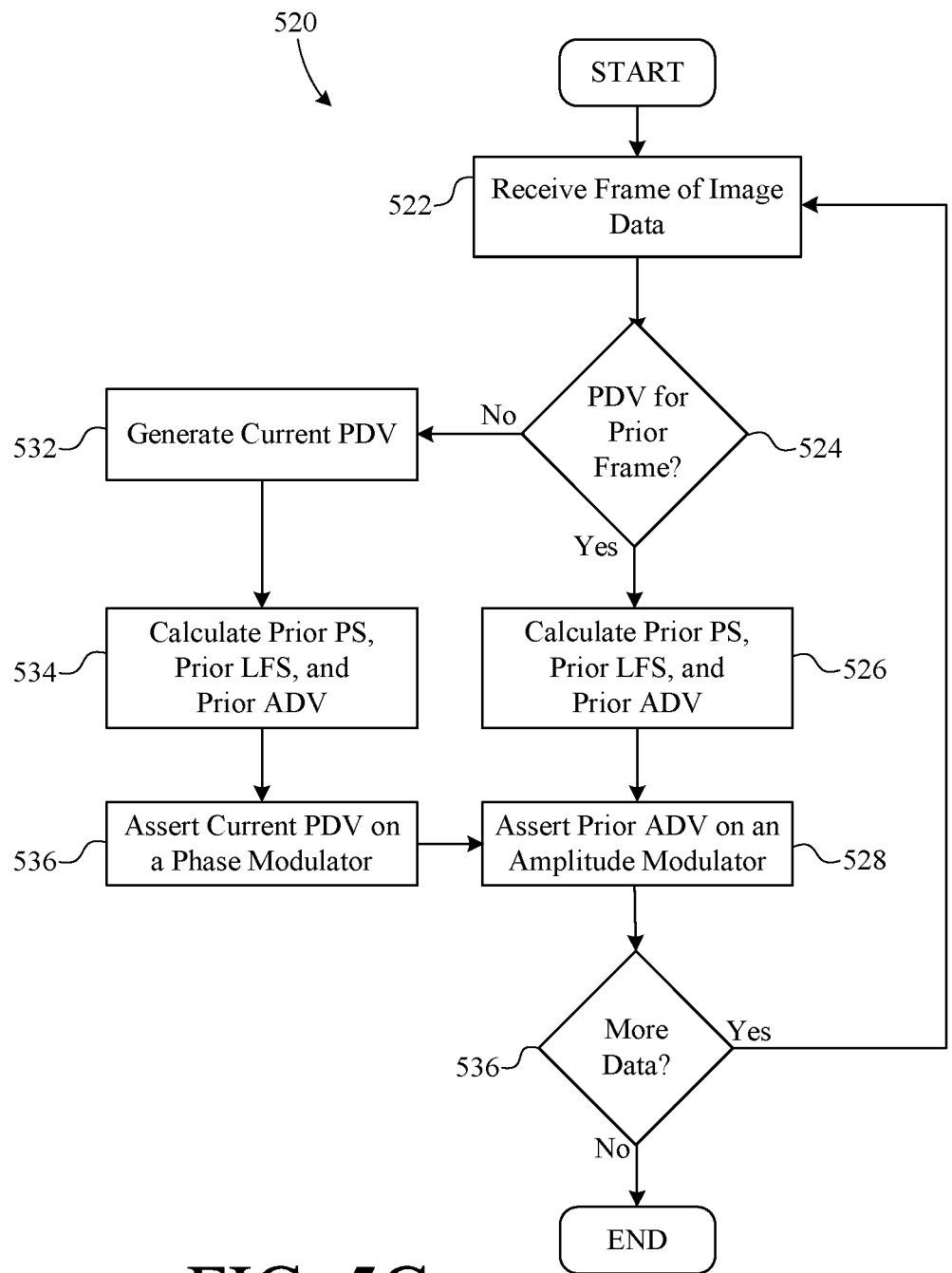
FIG. 5C is a flow chart summarizing an example method for generating drive values, phase states, and lightfield simulations from image data.

FIG. 5C is a flow chart summarizing an example method 520 for generating drive values, phase states, and lightfield simulations from image data. In the following explanation, the current PDV corresponds to the most recent frame of image data received in step 522, while the prior PS, prior LFS, and prior ADV correspond to a frame of image data received before the most recent frame of image data received in step 522. In a first step 522, a frame of image data is received. Then, in a second step 524, it is determined whether a set of phase drive values was generated for the prior frame. If a set of phase drive values was generated for the prior frame, method 520 continues to a third step 526, where a prior phase state, a prior lightfield simulation, and a prior set of amplitude drive values are calculated/determined based on the phase drive values of the prior frame. Then, in a fourth step 528, the prior amplitude drive values are asserted on an amplitude modulator, and, in a fifth step 530, it is determined whether there is any more incoming image data. If there is no more incoming image data, then method 520 ends. Otherwise, method 520 returns to first step 522, where the next frame of image data is received.

If, in second step 524, it is determined that a set of phase drive values was not generated for the prior frame, method 520 proceeds to a sixth step 532, where a set of phase drive values is generated based on the current frame of image data (i.e. the frame received in the most recent iteration of step 522). Next, in a seventh step 534, a prior phase state, a prior lightfield simulation, and a prior set of amplitude drive values are calculated based, at least partially, on the current set of phase drive values. In seventh step 534 the calculated prior phase state is a transitional phase state of a phase modulator transitioning from a previous phase state to a phase state corresponding to the phase drive values generated in sixth step 532. Then, in an eighth step 536, the current set of phase drive values is asserted on a phase modulator, and method 520 proceeds to fourth step 528.

Figure 5D:
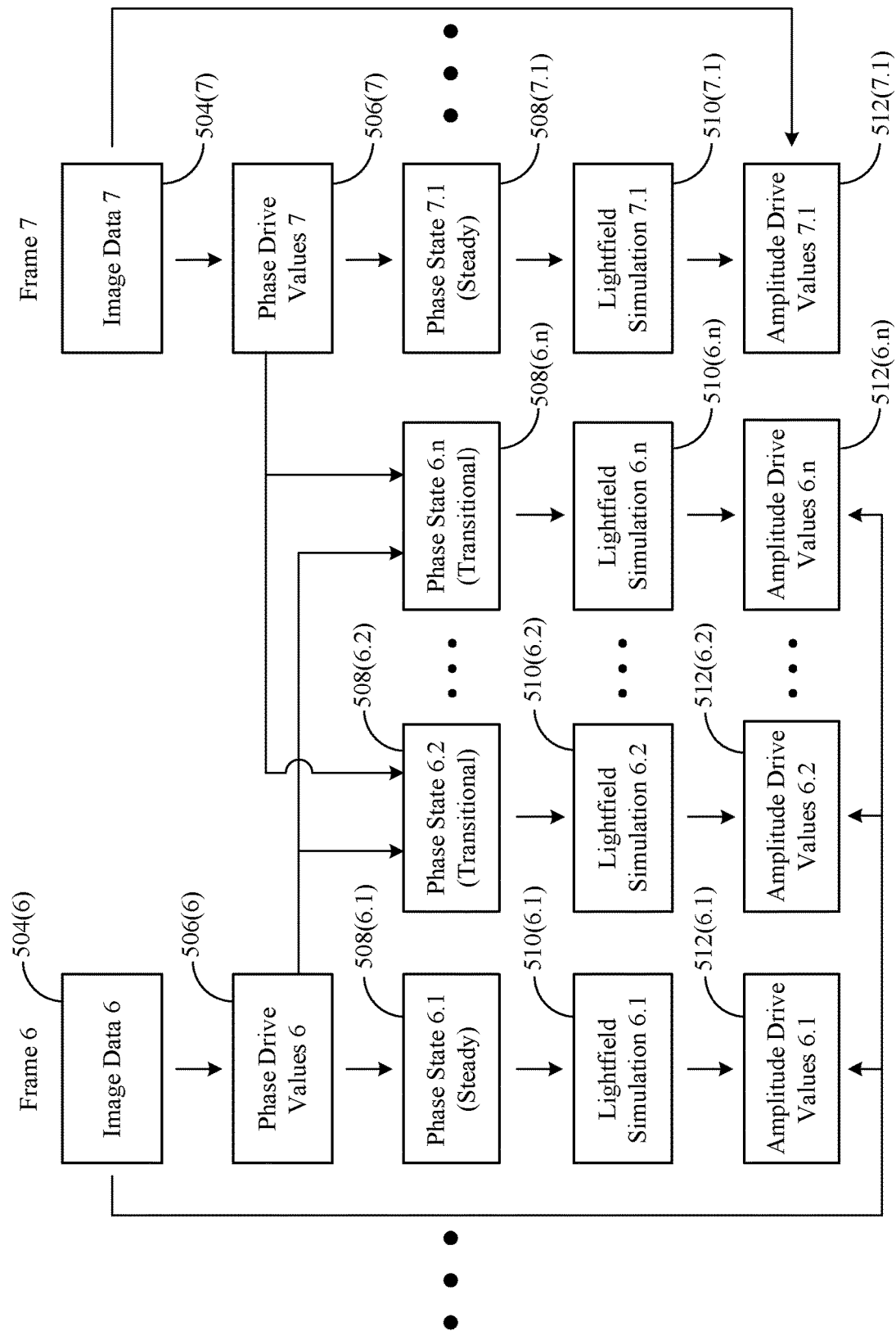
FIG. 5D is a diagram illustrating an alternate generation of drive values, phase states, and lightfield simulations from image data.

FIG. 5D is a diagram illustrating the generation of drive values, phase states, and lightfield simulations corresponding to two frames of video data 504(6-7), according to the methods described with reference to FIGS. 2B and 2C above. Like FIG. 5A, FIG. 5D is not a timing diagram and simply illustrates how/which data is utilized to generate the drive values, phase states, and lightfield simulations utilized to display the images corresponding to the input image data. Time is, however, a factor used to determine the intermediate phase states and, therefore, affects the lightfield simulations and amplitude drive values based on those intermediate phase states.

A sixth frame of image data 504(6) is utilized to generate a set of phase drive values 506(6). Phase drive values 506(6) are utilized to determine a steady phase state 508(6.1). Steady phase state 508(6.1) is utilized to generate a lightfield simulation 510(6.1), and lightfield simulation 510(6.1) is utilized, along with image data 504(6), to generate a set of amplitude drive values 512(6.1).

A seventh frame of image data 504(7) is utilized to generate a set of phase drive values 506(7). Phase drive values 506(7) are utilized to determine a steady phase state 508(7.1). Steady phase state 508(7.1) is utilized to generate a lightfield simulation 510(7.1), and lightfield simulation 510(7.1) is utilized, along with image data 504(7), to generate a set of amplitude drive values 512(7.1).

Additionally, at least one transitional phase state 508(6.2) is generated utilizing phase drive values 506(6) and phase drive values 506(7). Additional transitional phase states 508(6.n) can also be generated. The transitional phase states 508(6.2-6.n) describe the phase states of phase modulator 104 at various times between when phase modulator 104 is driven with steady phase state 508(6.1) and when phase modulator 104 is driven with steady phase state 508(7.1). Any number of transitional phase states 508 can be generated, based on the particular application of projection system 100. Each of transitional phase states 508(6.2-6.n) are utilized to generate corresponding lightfield simulations 510(6.2-6.n). Finally, each of lightfield simulations 510(6.2-6.n) are utilized, along with image data 504(6) to generate corresponding amplitude drive values 512(6.2-6.n).

Figure 5E:
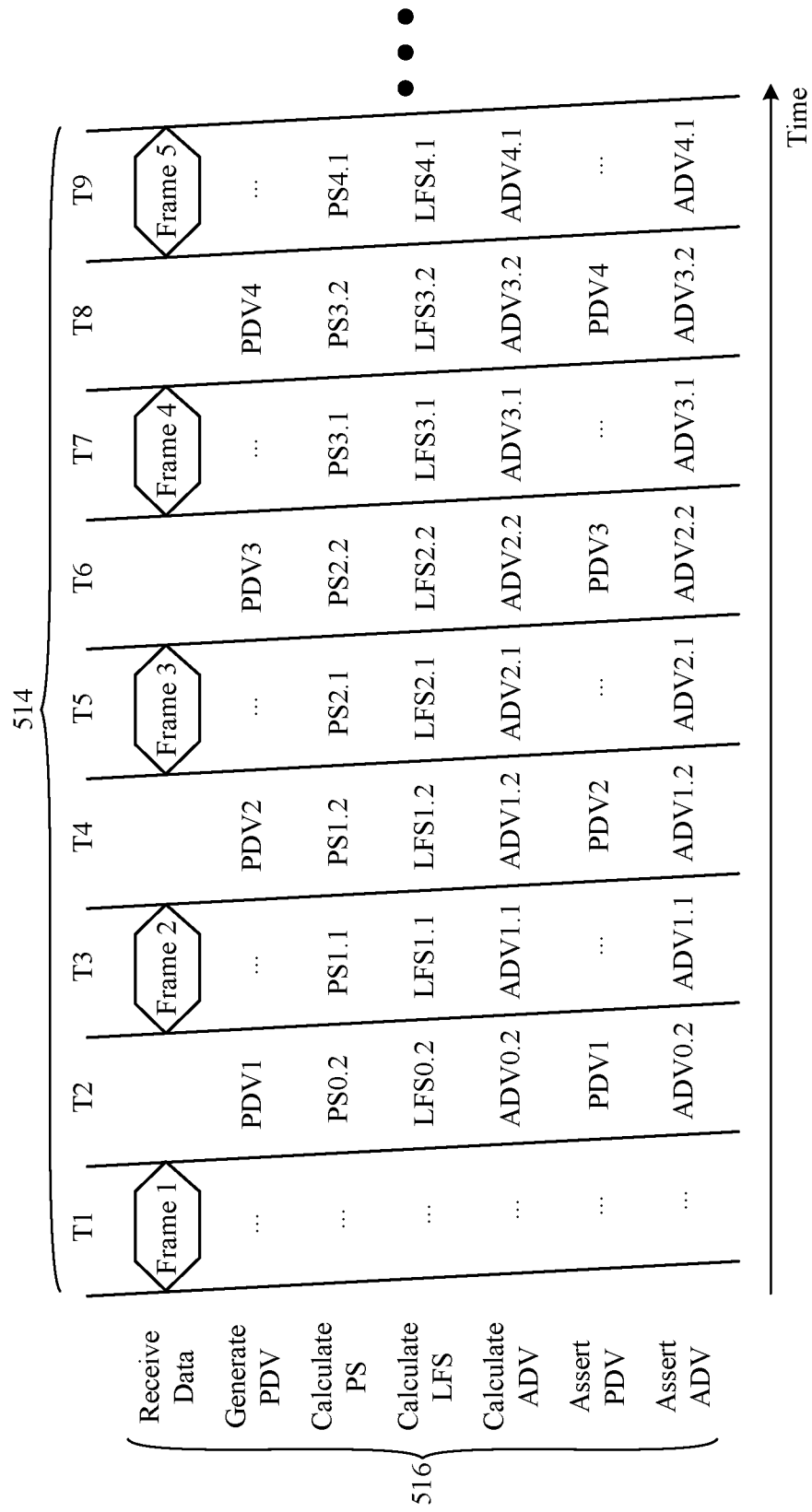
FIG. 5E is a timing diagram showing the relative timing of receiving image data and generating drive values, phase states, and lightfield simulations therefrom in another example system.

FIG. 5E is a timing diagram showing the relative timing of receiving image data and generating drive values, phase states, and lightfield simulations in the case where a single transitional phase state is generated between sequential frames of image data. For every frame of image data, one set of phase drive values (PDVs), two phase states (PSs), two lightfield simulations (LFSs), and two sets of amplitude drive values (ADVs) are calculated. The PDVs are asserted on phase modulator 104, and the ADVs are asserted on amplitude modulator 106. However, because the PDVs corresponding to a particular frame are required to calculate the PSs of the prior frame, not all of these steps occur sequentially for a given frame.

FIG. 5E illustrates relative timing for performing each of the actions necessary for displaying images in projection system 100. Each of columns 514 corresponds to a particular frame time of amplitude modulator 106 (48 fps in this example). During a first time period T1, a first frame of image data (Frame 1) is received. Then, during a second time period T2, PDV1 is generated and/or calculated. Optionally, a transitional phase state PS0.2 can be calculated utilizing PDV1 and an initial (prior) state of phase modulator 104 (e.g. on, off, etc.). A corresponding LFS0.2 and ADV0.2 can be calculated also. During time period T2 (or at least by the beginning of T3), PDV1 and ADV0.2 are also asserted onto phase modulator 104 and amplitude modulator 106, respectively.

During a third time period T3, a second frame of image data is received. Additionally, PS1.1 (corresponding to PDV1 at steady state), LFS1.1, and ADV1.1 are generated, and ADV1.1 is asserted on amplitude modulator 106 during time period T3. Next, during a fourth time period T4, PDV2, which corresponds to the image data of Frame 2, and PS1.2, LFS1.2, and ADV1.2, which all correspond to the transitional state of phase modulator 104 between Frame 1 and Frame 2, are generated. Because PS1.2 is determined by both PDV1 and PDV2, it can be generated only after PDV2 is determined. Additionally, PDV2 is asserted on phase modulator 104, initiating a transition (modeled as part of determining PS1.2) between PS1.1 and PS2.1, and ADV1.2 (which corresponds to PS1.2 and LFS1.2) is asserted on amplitude modulator 106.

Then, during a fifth time period T5, a third frame of image data is received, PS2.1, LFS2.1, and ADV2.1 are generated, and ADV2.1 is asserted on amplitude modulator 106. The process of displaying images continues in this manner, with the generation of each steady phase state (and the corresponding lightfield simulation and set of amplitude drive values) lagging two time periods behind the receipt of the corresponding frame of image data. Additionally, the assertion of the amplitude drive values corresponding to a steady state lags one time period behind the assertion of the corresponding set of phase drive values.

Figure 5F:
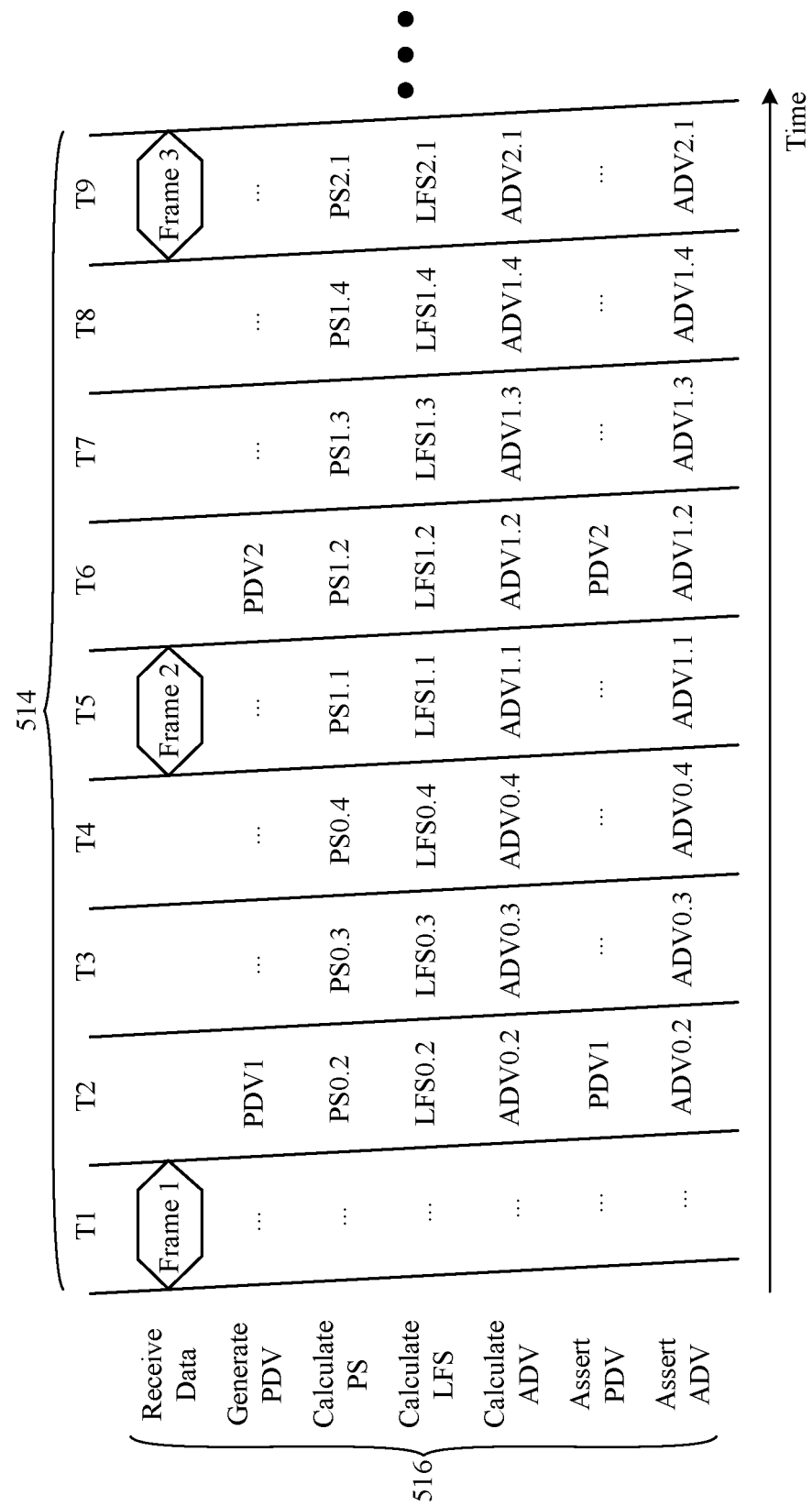
FIG. 5F is a timing diagram showing the relative timing of receiving image data and generating drive values, phase states, and lightfield simulations therefrom in yet another example system.

FIG. 5F is a timing diagram showing the relative timing of receiving image data and generating drive values, phase states, and lightfield simulations in the case where three transitional phase states are generated between sequential frames of image data. For every frame of image data, one set of phase drive values, four phase states, four lightfield simulations, and four sets of amplitude drive values are calculated. The PDVs are asserted on phase modulator 104, and the ADVs are asserted on amplitude modulator 106. However, because the PDVs corresponding to a particular frame are required to calculate the PSs of the prior frame, not all of these steps occur sequentially for a given frame.

FIG. 5F illustrates relative timing for performing each of the actions necessary for displaying images in projection system 100. Each of columns 514 corresponds to the framerate of amplitude modulator 106 (96 fps in this example). During a first time period T1, a first frame of image data (Frame 1) is received. Then, during a second time period T2, PDV1 is generated and/or calculated. Optionally, a transitional phase state PS0.2 can be calculated utilizing PDV1 and an initial state of phase modulator 104 (e.g. on, off, etc.). A corresponding LFS0.2 and ADV0.2 are also calculated. During time period T2 (or at least by the beginning of T3), PDV1 and ADV0.2 are asserted onto phase modulator 104 and amplitude modulator 106, respectively. Next, during a third time period T3, another transitional phase state PS0.3 and corresponding LFS0.3 and ADV0.3 are generated, and ADV0.3 is asserted on amplitude modulator 106. Then, during a fourth time period T4, yet another transitional phase state PS0.4 and corresponding LFS0.4 and ADV0.4 are generated, and ADV0.4 is asserted on amplitude modulator 106.

During a fifth time period T5, a second frame of image data is received. Additionally, PS1.1 (corresponding to PDV1 at steady state), LFS1.1, and ADV1.1 are generated, and ADV1.1 is asserted on amplitude modulator 106 during time period T5. Next, during a sixth time period T6, PDV2, which corresponds to the image data of Frame 2, and PS1.2, LFS1.2, and ADV1.2, which all correspond to the transitional state of phase modulator 104 between Frame 1 and Frame 2, are generated. Because PS1.2 is determined by both PDV1 and PDV2, it can be generated only after PDV2 is determined. Additionally, PDV2 is asserted on phase modulator 104, initiating a transition (modeled as part of determining PS1.2) between PS1.1 and PS2.1, and ADV1.2 (which corresponds to PS1.2 and LFS1.2) is asserted on amplitude modulator 106. Then, during a seventh time period T7, another transitional phase state PS1.3 and corresponding LFS1.3 and ADV1.3 are generated, and ADV1.3 is asserted on amplitude modulator 106. Then, during an eighth time period T8, yet another transitional phase state PS1.4 and corresponding LFS1.4 and ADV1.4 are generated, and ADV1.4 is asserted on amplitude modulator 106.

Then, during a ninth time period T9, a third frame of image data is received, PS2.1, LFS2.1, and ADV2.1 are generated, and ADV2.1 is asserted on amplitude modulator 106. The process of displaying images continues in this manner, with the generation of each steady phase state (e.g. PS x.1) (and the corresponding lightfield simulation and set of amplitude drive values) lagging four time periods behind the receipt of the corresponding frame of image data. Additionally, the assertion of the amplitude drive values corresponding to a steady state lags three time periods behind the assertion of the corresponding set of phase drive values.

Figure 5G:
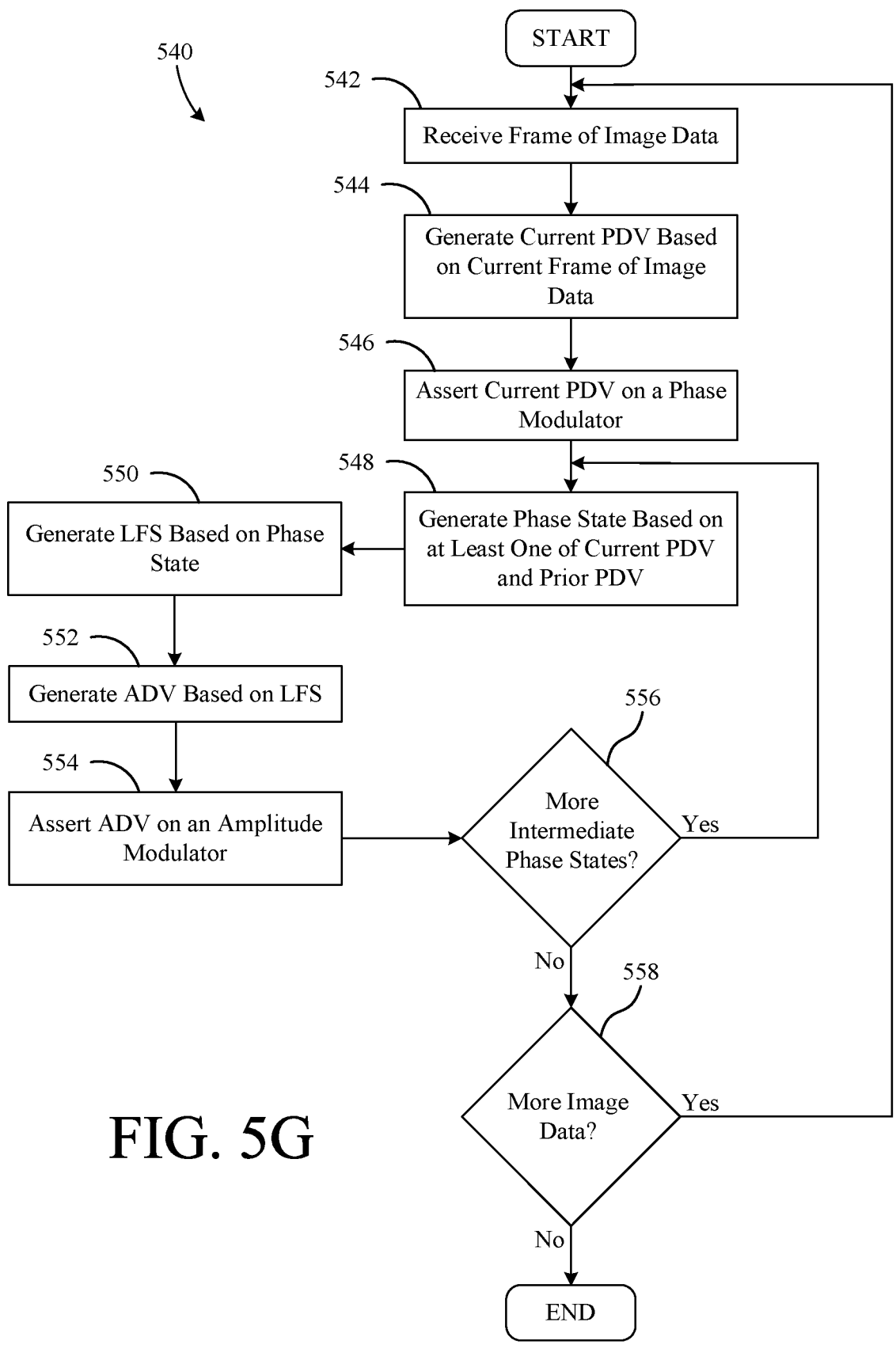
FIG. 5G is a flow chart summarizing another example method for generating drive values, phase states, and lightfield simulations from image data.

FIG. 5G is a flow chart summarizing an example method 540 for generating drive values, phase states, and lightfield simulations from image data. In a first step 542, a frame of image data is received. Then, in a second step 544, a current set of phase drive values (PDVs) is generated based on the current frame of image data. Next, in a third step 546, the current PDVs are asserted on a phase modulator. Then, in a fourth step 548, a phase state is generated based on at least one of the current set of PDVs and a prior set of PDVs. Next, in a fifth step 550, a lightfield simulation (LFS) is generated based on the phase state. Then, in a sixth step 552, a set of amplitude drive values (ADVs) is generated based on the LFS. Next, in a seventh step 554, the ADVs are asserted on an amplitude modulator. Then, in an eighth step 556, it is determined whether there are more intermediate phase states to be generated. If there are more intermediate phase states to be generated, method 540 returns to step 548. If there are no more intermediate phase states to be generated, method 540 continues to a ninth step 558, in which it is determined whether there are more frames of image data to be received. If there are more frames of image data to be received, method 540 returns to step 542. Otherwise, method 540 terminates.

FIG. 6 is a block diagram illustrating a transitional phase state of phase modulator 104. Phase modulator 104 includes a plurality of pixel groups 602 arranged in n rows 604 and m columns 606. During a transition between steady phase states, each group of pixels transitions between an initial phase delay (corresponding to the prior set of phase drive values) and a final phase delay (corresponding to the next set of phase drive values) according to a phase equation, $\varphi_{n,m}(t)$. The phase equations indicate how the phase delay of the pixels change over the time period of the transition. Each group of pixels (or each pixel, depending on the group size) has an individual phase equation, which is based on a number of factors, including, but not limited to, spatial cross-talk from neighboring pixels, the driving scheme used to apply the driving voltages (e.g. constant or varying voltage across the liquid crystal cell), the thickness of a liquid crystal layer of phase modulator 104, the temperature of phase modulator 104, properties of the liquid crystal material (e.g., chemical composition, viscosity, orientation, etc.), the age of phase modulator 104, properties of the lightfield incident on phase modulator 104 (e.g., wavelengths, power, etc.), and the total amount of light incident on phase modulator 104 over its lifetime. Temporal lightfield simulation module 114 utilizes data, based on at least a subset of these factors, to use and/or generate the phase equations for each pixel. A user/manufacturer of projection system 100 can decide which factors to include in the phase equations to generate equations having a desired accuracy, based on tradeoffs between computational efficiency and image quality.

The phase state of phase modulator 104 at any time during a transition can be expressed mathematically by the following matrix:

$$\begin{pmatrix} \varphi_{1,1}(t) & \cdots & \varphi_{1,m}(t) \\ \vdots & \ddots & \vdots \\ \varphi_{n,1}(t) & \cdots & \varphi_{n,m}(t) \end{pmatrix}$$

Wherein $\varphi_{i,j}(t)$ corresponds to the phase delay of a pixel in row i and column j on a phase modulator having a resolution of n×m pixels. Inputting a particular time to the matrix (i.e. evaluating each phase function at the particular time), provides the phase state of the phase modulator at that time. The phase state can then be used to determine the lightfield generated by the phase modulator at that time.

Figure 7A:
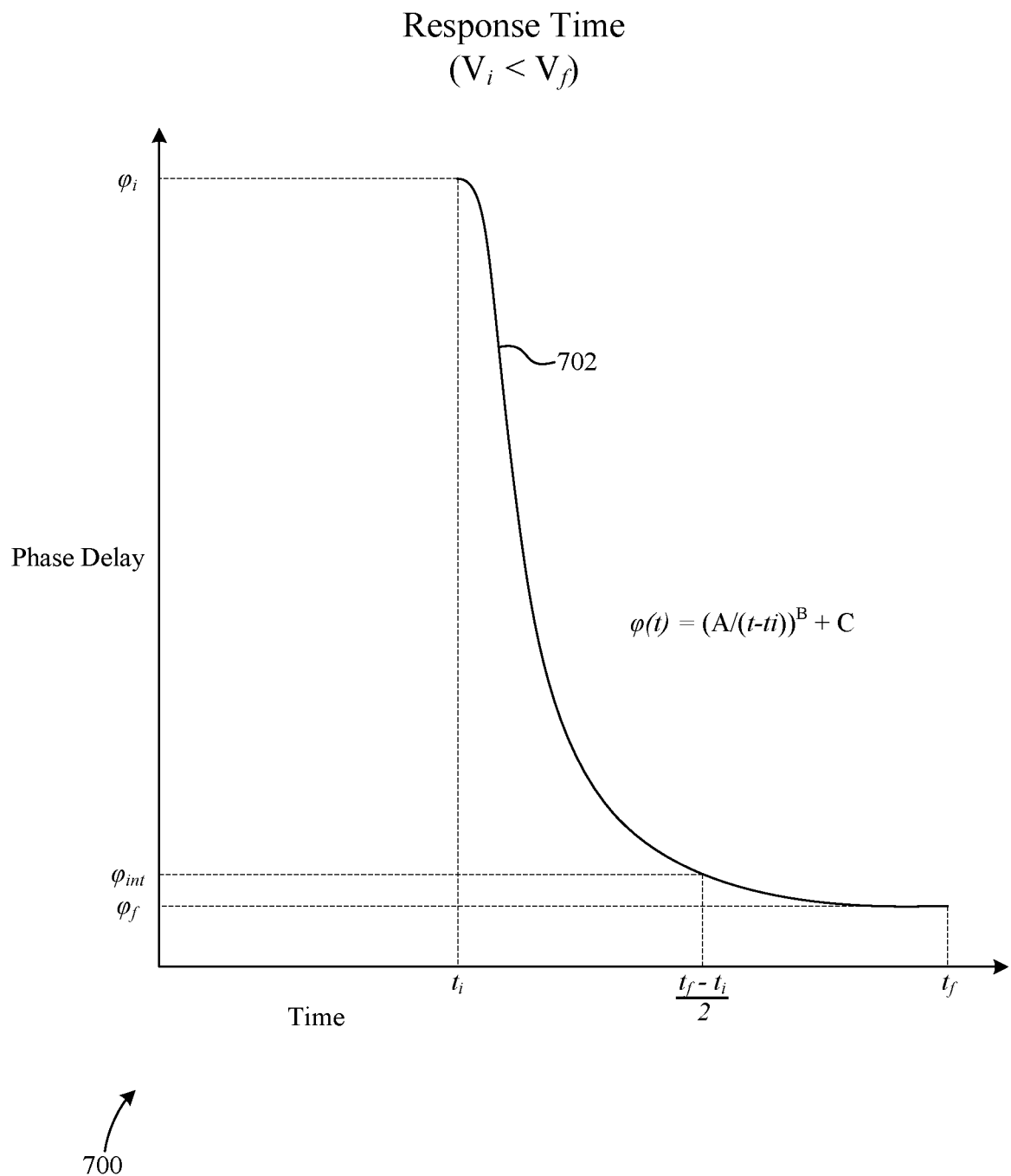
FIG. 7A is a graph showing an example transitional phase function for a representative pixel of the phase modulator of FIG. 1.

FIG. 7A is a graph 700 showing an example phase function 702. Phase function 702 illustrates a phase delay response of a corresponding pixel to a new, higher driving voltage over time. Prior to an initial time, $t_i$, a pixel corresponding to phase function 702 is driven with an initial voltage, corresponding to an initial (steady state) phase delay, $\varphi_i$. At time $t_i$ a new voltage is asserted onto the pixel, causing the liquid crystal layer of the pixel to be driven to a state corresponding to the new voltage. As a result, the phase delay imparted by the pixel also changes. At a final time, $t_f$, the pixel has reached a new steady state, imparting a final phase delay, $\varphi_f$. In the example embodiment, phase function 702 has the form:

$$\varphi(t) = \left(\frac{A}{t - t_i}\right)^B + C$$

where $\varphi(t)$ is the phase delay of the pixel at a time t, and A, B, and C are constants determined/used by temporal lightfield simulation module 114, based on calculated factors that affect the transition. The constants A, B, and C can be determined, for example, empirically, by testing the modulator pixels under various conditions to determine the effects of each of the calculated factors on a transition. Lightfield simulation module 114 can then determine the constants based on the characteristics of the modulator and the effects on the transition resulting therefrom.

In the example embodiment, phase function 702 can be used to determine a transitional phase delay for generating a transitional phase state. An intermediate time (e.g. halfway between $t_i$ and $t_f$) is selected for evaluating phase function 702. The intermediate time is selected to coincide with the timing of amplitude modulator 106. Then, the intermediate time is input to phase function 702, which outputs a phase delay. The output phase delay is the phase delay of the pixel at the intermediate time. Indeed, phase function 702 can provide the phase delay of the pixel at any time between the initial and final times and can be used to determine an infinite number of phase delays at an infinite number of times. As an alternative, phase function 702 can be averaged over a time period by evaluating the following integral:

$$AVG(\varphi) = \frac{1}{t_2 - t_1} \int_{t_1}^{t_2} \varphi(t) dt$$

where $t_1$ and $t_2$ are the lower and upper bounds, respectively, of the time period.

Figure 7B:
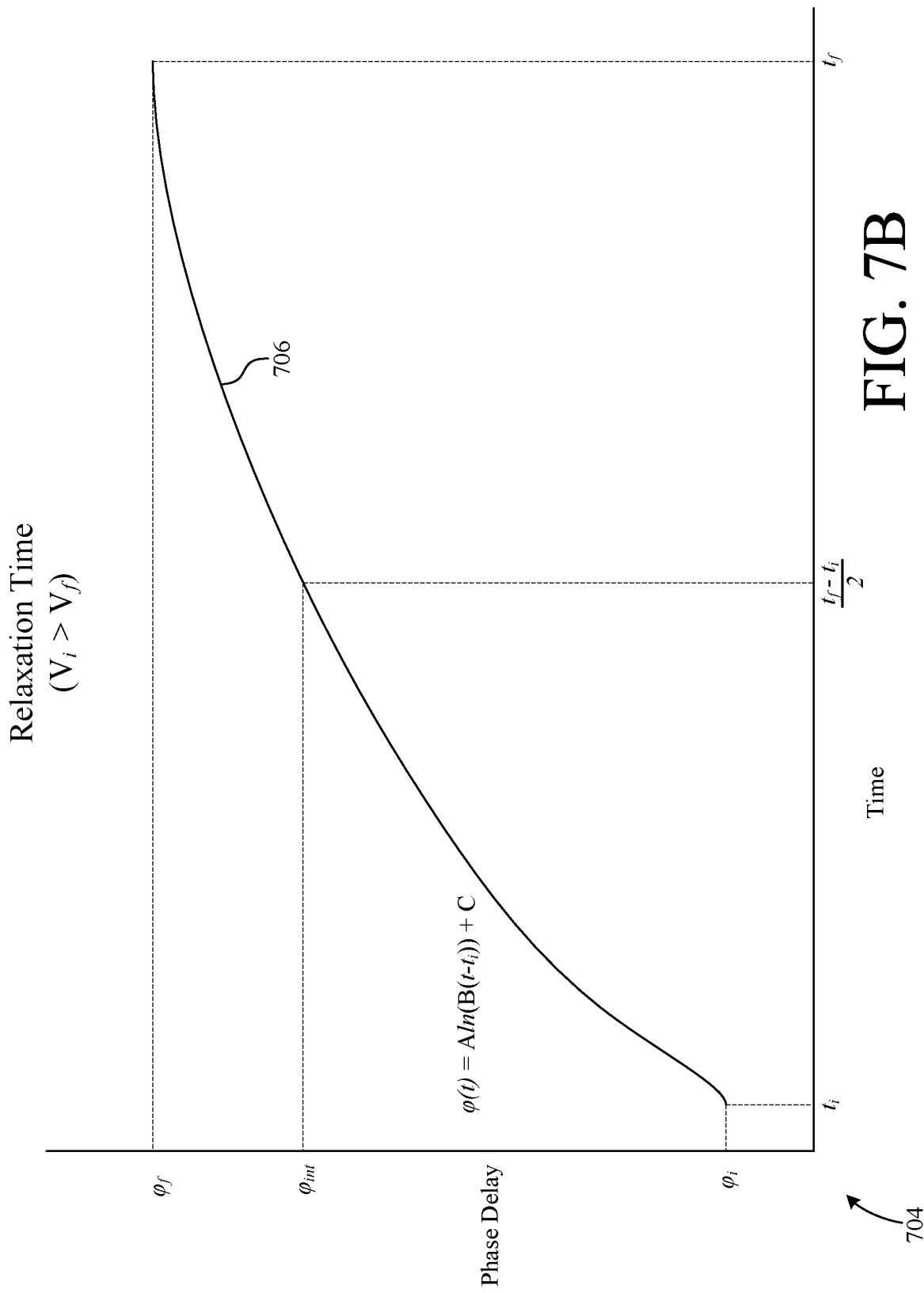
FIG. 7B is another graph showing another example transitional phase function for a representative pixel of the phase modulator of FIG. 1.

FIG. 7B is a graph 704 showing another example phase function 706. Phase function 706 illustrates a phase delay response of a corresponding pixel to a new, lower driving voltage over time. Prior to an initial time, $t_i$, a pixel corresponding to phase function 706 is driven with an initial voltage, corresponding to an initial (steady state) phase delay, $\varphi_i$. At time $t_i$ a new voltage is asserted onto the pixel, causing the liquid crystal layer of the pixel to relax to a state corresponding to the new voltage. As a result, the phase delay imparted by the pixel also changes. At a final time, $t_f$, the pixel has reached a new steady state, imparting a final phase delay, $\varphi_f$. In the example embodiment, phase function 702 has the form:

$$\varphi(t) = A\ln(B(t-t_i)) + C$$

where $\varphi(t)$ is the phase delay of the pixel at a time t, and A, B, and C are constants determined/used by temporal lightfield simulation module 114, based on calculated factors that affect the transition.

During a transition between sets of phase drive values, the phase delay of any pixel of phase modulator 104 can be described by a phase function of the form of phase function 702 or phase function 706, based on whether the pixel is being driven with a voltage that is higher or lower, respectively, than the prior driving voltage. Temporal lightfield simulation module 114 determines which form to utilize and the values of the required constants to determine the particular phase function for each pixel. Then, temporal lightfield simulation module 114 can calculate the phase delay for each pixel at any time (or the average phase delay for each pixel over any time period) during the transition to determine a phase state of phase modulator 104 at any time during the transition.

Figure 8:
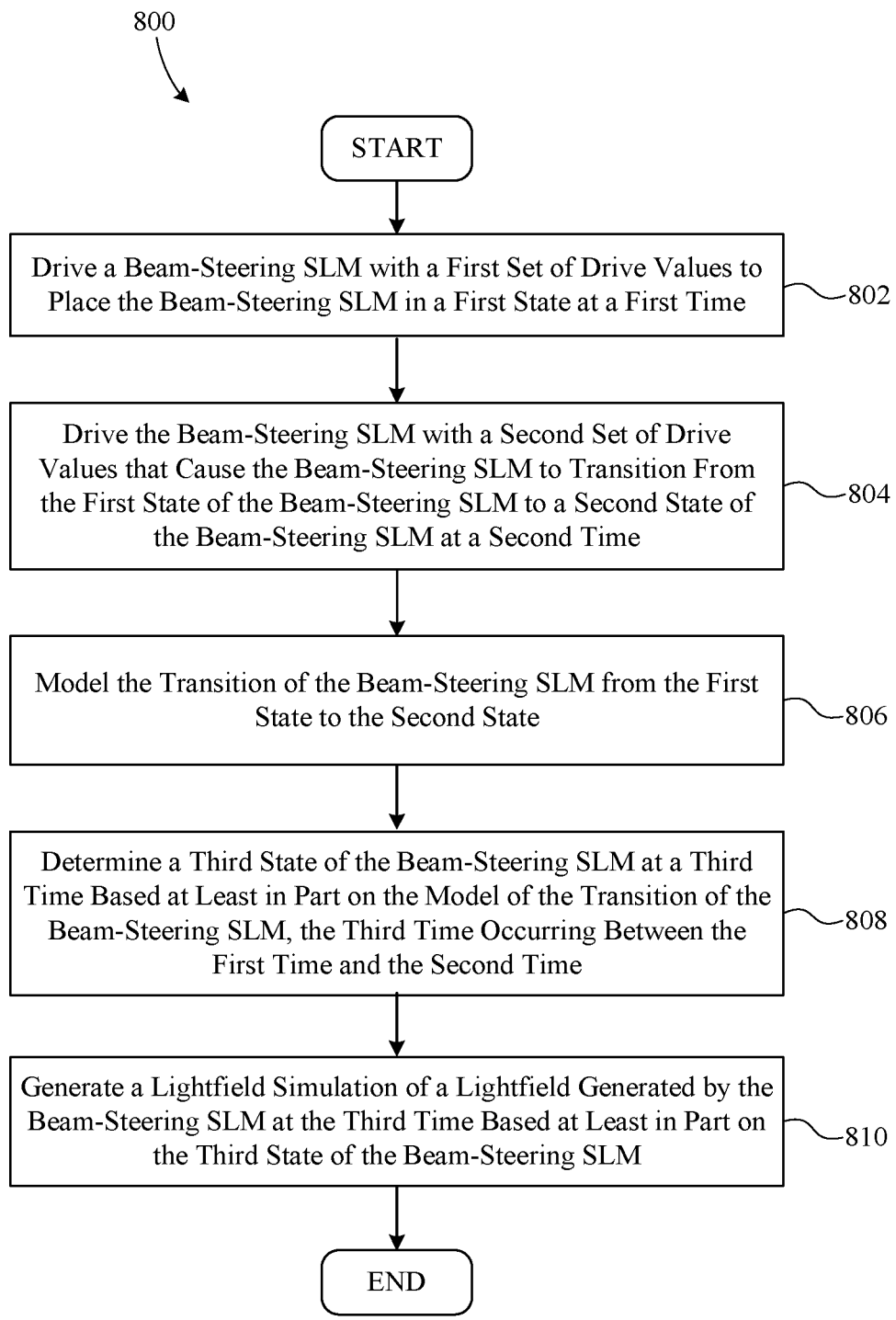
FIG. 8 is a flow chart summarizing an example method for generating a lightfield simulation.

FIG. 8 is a flow chart summarizing an example method 800 for generating a lightfield simulation. In a first step 802, a beam-steering SLM is driven with a first set of drive values to place the beam-steering SLM in a first state at a first time. Next, in a second step 804, the beam-steering SLM is driven with a second set of drive values that cause the beam-steering SLM to transition from the first state to a second state of the beam-steering SLM at a second time. The second state of the beam-steering SLM is associated with the second set of drive values. Then, in a third step 806, the transition of the beam-steering SLM from the first state to the second state is modeled. Next, in a fourth step 808, a third state of the beam-steering SLM at a third time (occurring between the first time and the second time) is determined based at least in part on the model of the transition of the beam-steering SLM. Then, in a fifth step 810, a lightfield simulation of a lightfield generated by the beam-steering SLM at the third time is generated based at least in part on the third state of the beam-steering SLM.

Figure 9:
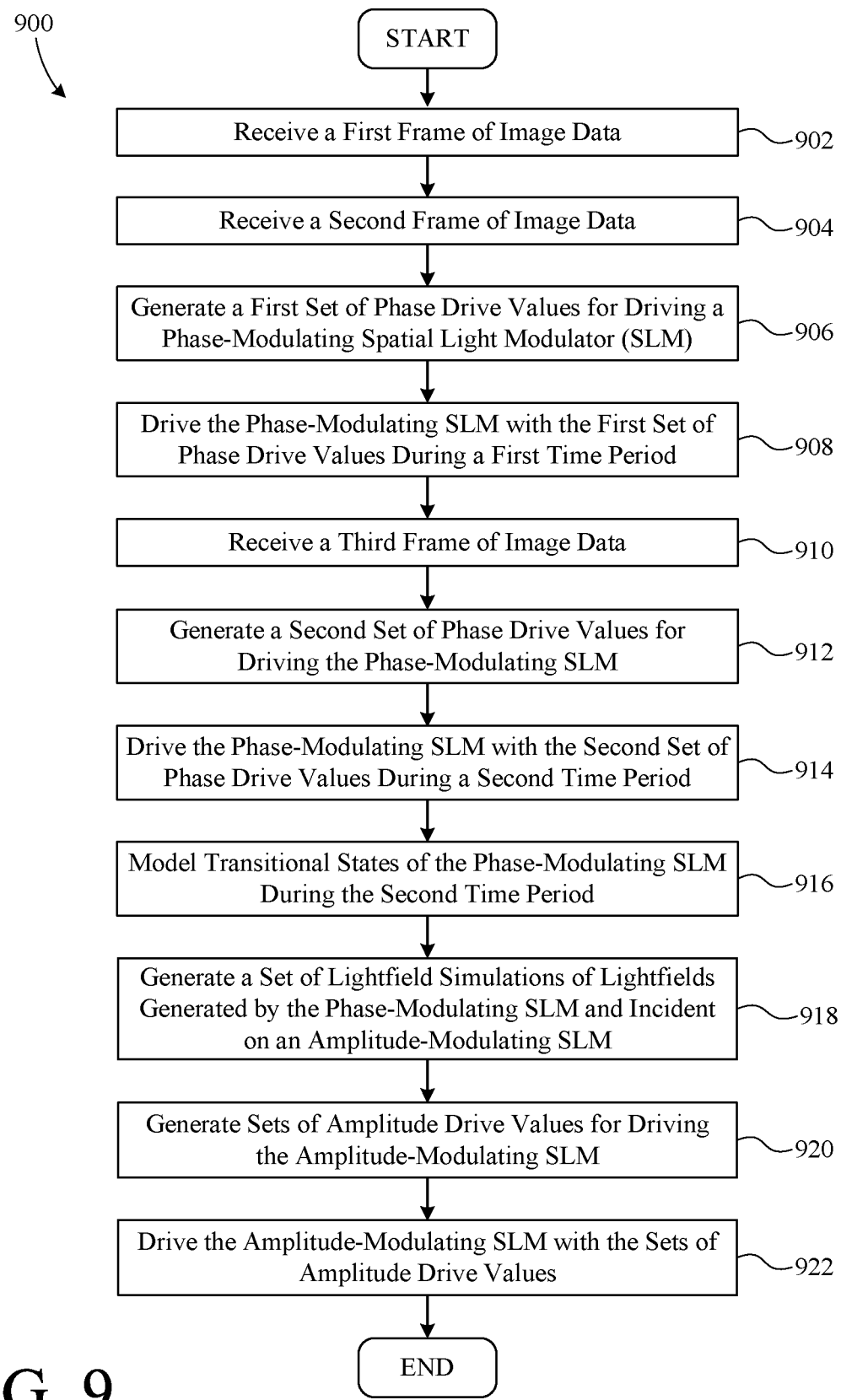
FIG. 9 is a flow chart summarizing an example method for generating images.

FIG. 9 is a flow chart summarizing an example method 900 for generating images in a multi-modulation projection system. In a first step 902, a first frame of image data is received. Then, in a second step 904, a second frame of image data is received. Next, in a third step 906, a first set of phase drive values for driving a phase-modulating spatial light modulator (SLM) are generated. The first set of phase drive values are based at least in part on the first frame of image data. Then, in a fourth step 908, the phase-modulating SLM is driven with the first set of phase drive values during a first time period. Next, in a fifth step 910, a third frame of image data is received. Then, in a sixth step 912, a second set of phase drive values for driving the phase-modulating SLM are generated. The second set of phase drive values are based at least in part on the third frame of image data. Next, in a seventh step 914, the phase-modulating SLM is driven with the second set of phase drive values during a second time period. Then, in an eighth step 916, transitional states of the phase-modulating SLM are modelled during the second time period. The transitional states are based at least in part on the first set of phase drive values and the second set of phase drive values. Next, in a ninth step 918, a set of lightfield simulations is generated. The set of lightfield simulations includes a first subset of the set of lightfield simulations corresponding to the first set of phase drive values, a second subset of the set of lightfield simulations corresponding to the second set of phase drive values, and a third subset of the set of lightfield simulations corresponding to one or more of the transitional states of the phase-modulating SLM. Then, in a tenth step 920, sets of amplitude drive values are generated for driving the amplitude-modulating SLM. Each of the sets of amplitude drive values is based on and/or corresponds to one of the sets of lightfield simulations. Then, in an eleventh step 922, the amplitude-modulating SLM is driven with the sets of amplitude drive values.

Figure 10:
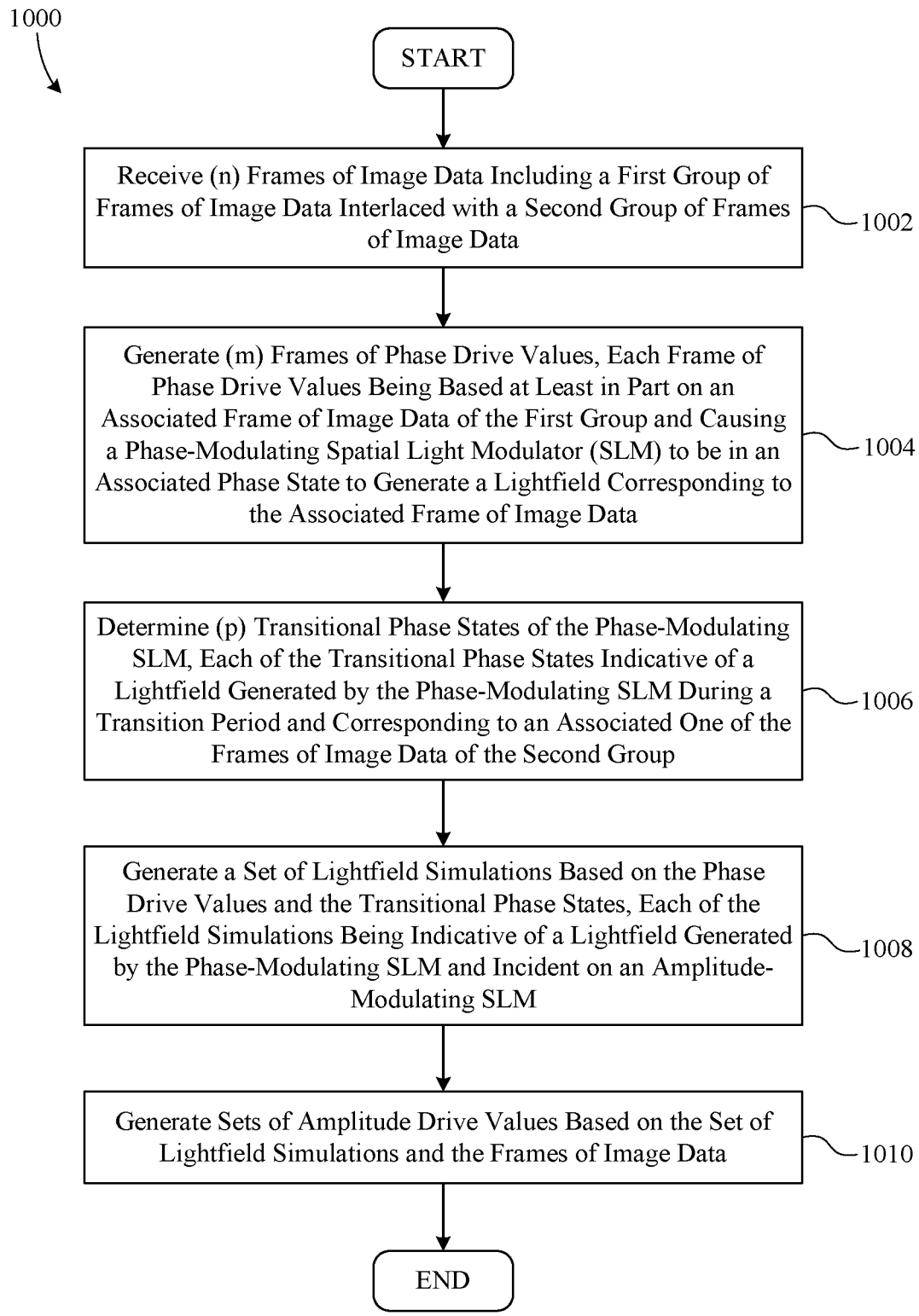
FIG. 10 is a flow chart summarizing another example method for generating images.

FIG. 10 is a flowchart summarizing an example method 1000 of generating images in a multi-modulation projection system. In a first step 1002, (n) frames of image data are received. The frames of image data include a first group of frames interlaced with a second group of frames. Then, in a second step 1004, (m) frames of phase drive values are generated. Each frame of phase drive values is based, at least in part, on an associated frame of image data of the first group of frames and causes a phase-modulating spatial light modulator (SLM) to be in an associated phase state to generate a lightfield corresponding to the associated frame of image data. Next, in a third step 1006, (p) transitional phase states of the phase-modulating SLM are determined. Each of the transitional phase states are indicative of a lightfield generated by the phase-modulating SLM during a transition period and corresponds to one of the frames of image data of the second group of frames. Then, in a fourth step 1008, a set of lightfield simulations is generated based on the phase drive values and the transitional phase states. Each of the lightfield simulations is indicative of a lightfield generated by the phase-modulating SLM and incident on an amplitude-modulating SLM. Then, in a fifth step 1010, a set of amplitude drive values is generated based on the set of lightfield simulations and the frames of image data. Each of the sets of amplitude drive values causes the amplitude SLM to spatially modulate a corresponding one of the lightfields incident on the amplitude SLM to generate an image corresponding to the image data.

The description of particular embodiments of the present invention is now complete. Many of the described features may be substituted, altered or omitted without departing from the scope of the invention. For example, alternate factors can be used when modeling the phase functions of the pixels of the phase-modulating SLM. As another example, alternate system architectures (e.g. those having additional modulators) can be utilized. Indeed, the present invention can be incorporated into any system in which it would be useful to simulate the lightfield of a modulator at a higher frequency than the modulator itself is capable of switching. These and other deviations from the particular embodiments shown will be apparent to those skilled in the art, particularly in view of the foregoing disclosure. Various aspects of the present invention may be appreciated from the following enumerated example embodiments (EEEs):

EEE 1. In a projection system, a method for generating a lightfield simulation, said method comprising:
driving a beam-steering spatial light modulator (SLM) with a first set of drive values to place said beam-steering SLM in a first state at a first time;
driving said beam-steering SLM with a second set of drive values that cause said beam-steering SLM to transition from said first state of said beam-steering SLM to a second state of said beam-steering SLM at a second time;
modeling said transition of said beam-steering SLM from said first state to said second state;
determining a third state of said beam-steering SLM at a third time based at least in part on said model of said transition of said beam-steering SLM, said third time occurring between said first time and said second time; and
generating a lightfield simulation of a lightfield generated by said beam-steering SLM at said third time based at least in part on said third state of said beam-steering SLM.

EEE 2. The method of EEE 1, wherein said step of modeling said transition of said beam-steering SLM from said first state to said second state includes modeling said transition of said beam-steering SLM based at least in part on an age of said beam-steering SLM.

EEE 3. The method of EEE 1 or EEE2, wherein said step of modeling said transition of said beam-steering SLM from said first state to said second state includes modeling said transition of said beam-steering SLM based at least in part on said first state and said second state of said beam-steering SLM.

EEE 4. The method of any of EEEs 1-3, wherein said step of modeling said transition of said beam-steering SLM from said first state to said second state includes modeling said transition of said beam-steering SLM based at least in part on physical characteristics of a liquid crystal layer of said beam-steering SLM.

EEE 5. The method of any of EEEs 1-4, wherein:
said beam-steering SLM includes a plurality of pixels; and
said step of modeling said transition of said beam-steering SLM from said first state to said second state includes modeling said transition of said beam-steering SLM on a pixel-by-pixel basis.

EEE 6. The method of any of EEEs 1-5, wherein:
said beam-steering SLM includes a plurality of pixels; and
said step of modeling said transition of said beam-steering SLM from said first state to said second state includes modeling said transition of said beam-steering SLM based at least in part on crosstalk between pixels of said plurality of pixels.

EEE 7. The method of any of EEEs 1-6, wherein said step of modeling said transition of said beam-steering SLM from said first state to said second state includes modeling said transition of said beam-steering SLM based at least in part on a temperature of said beam-steering SLM.

EEE 8. The method of any of EEEs 1-7, wherein said step of modeling said transition of said beam-steering SLM from said first state to said second state includes modeling said transition of said beam-steering SLM based at least in part on an intensity of a lightfield incident on said beam-steering SLM.

EEE 9. The method of any of EEEs 1-8, wherein said step of modeling said transition of said beam-steering SLM from said first state to said second state includes modeling said transition of said beam-steering SLM based at least in part on a physical property of a lightfield incident on said beam-steering SLM.

EEE 10. The method of any of EEEs 1-9, wherein said step of modeling said transition of said beam-steering SLM from said first state to said second state includes modeling said transition of said beam-steering SLM based at least in part on a total amount of light incident on said beam-steering SLM over a lifetime of said beam-steering SLM.

EEE 11. The method of any of EEEs 1-10, wherein said step of modeling a transition of said beam-steering SLM from said first state to said second state includes:
generating a transition function, said transition function being indicative of a relationship between time and a phase delay imparted on an incident lightfield by a pixel of said beam-steering SLM; and
determining a value of said transition function at said third time.

EEE 12. The method of EEE 11, wherein said step of determining a value of said transition function at said third time includes determining an average of said transition function over a time period including said third time.

EEE 13. The method of any of EEEs 1-12, further comprising determining a plurality of states of said beam-steering SLM at a plurality of times based at least in part on said model of said transition of said beam-steering SLM, each of said plurality of times occurring between said first time and said second time.

EEE 14. A controller for controlling a projection system, said controller comprising:
- a processing unit configured to execute code;
- an interface coupled to receive image data indicative of at least one image to be displayed; and
- memory electrically coupled to store data and said code, said data and said code including
  - a beam-steering drive module configured to
    - drive a beam-steering spatial light modulator (SLM) with a first set of drive values to place said beam-steering SLM in a first state at a first time, and
    - drive said beam-steering SLM with a second set of drive values that cause said beam-steering SLM to transition from said first state of said beam-steering SLM to a second state of said beam-steering SLM at a second time, and
  - a temporal lightfield simulation module configured to
    - model said transition of said beam-steering SLM from said first state to said second state,
    - determine a third state of said beam-steering SLM at a third time based at least in part on said model of said transition of said beam-steering SLM, said third time occurring between said first time and said second time, and
    - generate a lightfield simulation of a lightfield generated by said beam-steering SLM at said third time based at least in part on said third state of said beam-steering SLM.

EEE 15. The controller of EEE 14, wherein said temporal lightfield simulation module is configured to model said transition of said beam-steering SLM based at least in part on an age of said beam-steering SLM.

EEE 16. The controller of EEE 14 or EEE 15, wherein said temporal lightfield simulation module is configured to model said transition of said beam-steering SLM based at least in part on said first state and said second state of said beam-steering SLM.

EEE 17. The controller of any of EEEs 14-16, wherein said temporal lightfield simulation module is configured to model said transition of said beam-steering SLM based at least in part on physical characteristics of a liquid crystal layer of said beam-steering SLM.

EEE 18. The controller of any of EEEs 14-17, wherein:
- said beam-steering SLM includes a plurality of pixels; and
- said temporal lightfield simulation module is configured to model said transition of said beam-steering SLM on a pixel-by-pixel basis.

EEE 19. The controller of any of EEEs 14-18, wherein:
- said beam-steering SLM includes a plurality of pixels; and
- said temporal lightfield simulation module is configured to model said transition of said beam-steering SLM based at least in part on crosstalk between pixels of said plurality of pixels.

EEE 20. The controller of any of EEEs 14-19, wherein said temporal lightfield simulation module is configured to model said transition of said beam-steering SLM based at least in part on a temperature of said beam-steering SLM.

EEE 21. The controller of any of EEEs 14-20, wherein said temporal lightfield simulation module is configured to model said transition of said beam-steering SLM based at least in part on an intensity of a lightfield incident on said beam-steering SLM.

EEE 22. The controller of any of EEEs 14-21, wherein said temporal lightfield simulation module is configured to model said transition of said beam-steering SLM based at least in part on a physical property of a lightfield incident on said beam-steering SLM.

EEE 23. The controller of any of EEEs 14-22, wherein said temporal lightfield simulation module is configured to model said transition of said beam-steering SLM based at least in part on a total amount of light incident on said beam-steering SLM over a lifetime of said beam-steering SLM.

EEE 24. The controller of any of EEEs 14-23, wherein said temporal lightfield simulation module is configured to:
- generate a transition function, said transition function being indicative of a relationship between time and a phase delay imparted on an incident lightfield by a pixel of said beam-steering SLM; and
- determine a value of said transition function at said third time.

EEE 25. The controller of EEE 24, said temporal lightfield simulation module is configured to determine an average of said transition function during a time period including said third time.

EEE 26. The controller of any of EEEs 14-25, wherein said temporal lightfield simulation module is configured to determine a plurality of states of said beam-steering SLM at a plurality of times based at least in part on said model of said transition of said beam-steering SLM, each of said plurality of times occurring between said first time and said second time.

EEE 27. In a projection system, a method for generating images, said method comprising:
- receiving a first frame of image data;
- generating a first set of phase drive values for driving a phase-modulating spatial light modulator (SLM), said first set of phase drive values being based at least in part on said first frame of image data;
- driving said phase-modulating SLM with said first set of phase drive values during a first time period;
- receiving a second frame of image data;
- generating a second set of phase drive values for driving said phase-modulating SLM, said second set of phase drive values being based at least in part on said second frame of image data;
- driving said phase-modulating SLM with said second set of phase drive values during a second time period;
- modeling transitional states of said phase-modulating SLM during said second time period, said transitional states being based at least in part on said first set of phase drive values and said second set of phase drive values;
- generating a set of lightfield simulations of lightfields generated by said phase-modulating SLM and incident on an amplitude-modulating SLM, a first subset of said set of lightfield simulations corresponding to said first set of phase drive values, a second subset of said set of lightfield simulations corresponding to said second set of phase drive values, and a third subset of said set of lightfield simulations corresponding to one or more of said transitional states of said phase-modulating SLM;
- generating sets of amplitude drive values for driving said amplitude-modulating SLM, each of said sets of amplitude drive values corresponding to an associated one of said lightfield simulations; and driving said amplitude-modulating SLM with said sets of amplitude drive values.

EEE 28. The method of EEE 27, wherein said step of generating a second set of phase drive values includes:

utilizing said first set of phase drive values as an initial approximation of said second set of phase drive values; and altering said initial approximation based on said third frame of image data.

EEE 29. The method of EEE 27 or EEE 28, wherein:

said phase-modulating SLM comprises a plurality of pixels; and said step of modeling transitional states of said phase-modulating SLM during said second time period includes modeling individual transitional states of pixels of said plurality of pixels.

EEE 30. The method of EEE 29, wherein:

said step of driving said phase-modulating SLM with said first set of phase drive values includes asserting a first set of voltages across said plurality of pixels, each voltage of said first set of voltages indicated by an associated value of said first set of phase drive values;

said step of driving said phase-modulating SLM with said second set of phase drive values includes asserting a second set of voltages across said plurality of pixels, each voltage of said second set of voltages indicated by an associated value of said second set of phase drive values; and said step of modeling individual transitional states of said plurality of pixels includes determining an individual transition of each pixel of said plurality of pixels from a corresponding voltage of said first set of voltages to a corresponding voltage of said second set of voltages.

EEE 31. The method of EEE 30, wherein said step of modeling transitional states of said phase-modulating SLM includes determining a transitional state of each pixel of said plurality of pixels at a particular time during said individual transition of each pixel.

EEE 32. The method of EEE 30, wherein said step of modeling transitional states of said phase-modulating SLM includes determining an average state of each pixel of said plurality of pixels over a period of time during said individual transition of each said pixel.

EEE 33. The method of any of EEEs 27-32, wherein said step of modeling transitional states of said phase-modulating SLM includes modeling transitional states of said phase-modulating SLM based at least in part on a physical characteristic of said phase-modulating SLM.

EEE 34. The method of any of EEEs 27-33, wherein said step of modeling transitional states of said phase-modulating SLM includes modeling transitional states of said phase-modulating SLM based at least in part on a physical characteristic of a liquid crystal layer of said phase-modulating SLM.

EEE 35. The method of any of EEEs 27-34, wherein said step of modeling transitional states of said phase-modulating SLM includes modeling transitional states of said phase-modulating SLM based at least in part on a physical characteristic of a lightfield incident on said phase-modulating SLM.

EEE 36. The method of EEE 35, wherein said step of modeling transitional states of said phase-modulating SLM based at least in part on a physical characteristic of a lightfield incident on said phase-modulating SLM includes modeling transitional states of said phase modulating SLM based at least in part on a history of said lightfield.

EEE 37. The method of any of EEEs 27-36, wherein said step of generating a set of lightfield simulations includes modeling each of a plurality of pixels of said phase-modulating SLM as a source of spherical waves having a phase delay determined at least in part based on a corresponding one of said transitional states.

EEE 38. The method of any of EEEs 27-37, wherein said step of generating a set of lightfield simulations includes modeling each of a plurality of pixels of said phase-modulating SLM as an origin point of a light ray having an angle with respect to a surface of said phase-modulating SLM determined at least in part based on a corresponding one of said transitional states.

EEE 39. The method of any of EEEs 27-38, wherein said first frame and said second frame are temporally sequential.

EEE 40. The method of EEE 39, wherein said third subset of lightfield simulations includes exactly one lightfield simulation.

EEE 41. The method of EEE 39, wherein said third subset of lightfield simulations includes more than one lightfield simulation.

EEE 42. The method of any of EEEs 27-41, wherein:

said first frame and said second frame are not temporally sequential; and said third subset of lightfield simulations corresponds to at least one intervening frame temporally between said first frame and said second frame.

EEE 43. A controller for controlling a projection system, said controller comprising:

a processing unit configured to execute code;

an interface coupled to receive a first frame of image and a second frame of image data; and memory electrically coupled to store data and said code, said data and said code including a phase drive module configured to generate a first set of phase drive values for driving a phase-modulating spatial light modulator (SLM), said first set of phase drive values being based at least in part on said first frame of image data, generate a second set of phase drive values for driving said phase-modulating SLM, said second set of phase drive values being based at least in part on said second frame of image data, drive said phase-modulating SLM with said first set of phase drive values during a first time period, and drive said phase-modulating SLM with said second set of phase drive values during a second time period, a temporal lightfield simulation module configured to model transitional states of said phase-modulating SLM during said second time period, said transitional states being based at least in part on said first phase drive values and said second phase drive values, and generate a set of lightfield simulations of lightfields generated by said phase-modulating SLM and incident on an amplitude-modulating SLM, a first subset of said set of lightfield simulations corresponding to said first set of phase drive values, a second subset of said set of lightfield simulations corresponding to said second set of phase drive values, and a third subset of said set of lightfield simulations corresponding to one or more of said transitional states of said phase-modulating SLM, and an amplitude drive module configured to
generate sets of amplitude drive values for driving said amplitude-modulating SLM, each of said sets of amplitude drive values corresponding to one of said set of lightfield simulations, and
drive said amplitude SLM with said sets of amplitude drive values.

EEE 44. The controller of EEE 43, wherein said phase drive module is configured to:
utilize said first set of phase drive values as an initial approximation of said second set of phase drive values when generating said second set of phase drive values; and
alter said initial approximation of said second set of phase drive values based on said third frame of image data.

EEE 45. The controller of EEE 43 or EEE 44, wherein:
said phase-modulating SLM comprises a plurality of pixels; and
said temporal lightfield simulation module is configured to model individual transitional states of pixels of said plurality of pixels.

EEE 46. The controller of EEE 45, wherein:
said phase drive module is configured to assert a first set of voltages across said plurality of pixels, each voltage of said first set of voltages based on said first set of phase drive values;
said phase drive module is configured to assert a second set of voltages across said plurality of pixels, each voltage of said second set of voltages based on said second set of phase drive values; and
said temporal lightfield simulation module is configured to determine an individual transition of each pixel of said plurality of pixels from a corresponding voltage of said first set of voltages to a corresponding voltage of said second set of voltages.

EEE 47. The controller of EEE 46, wherein said temporal lightfield simulation module is configured to determine a transitional state of each pixel of said plurality of pixels at a particular time during said individual transition.

EEE 48. The controller of EEE 46, wherein said temporal lightfield simulation module is configured to determine an average transitional state of each of said plurality of pixels over a period of time during said individual transition.

EEE 49. The controller of any of EEEs 43-48, wherein said temporal lightfield simulation module is configured to model transitional states of said phase-modulating SLM based at least in part on a physical characteristic of said phase-modulating SLM.

EEE 50. The controller of any of EEEs 43-49, wherein said temporal lightfield simulation module is configured to model transitional states of said phase-modulating SLM based at least in part on a physical characteristic of a liquid crystal layer of said phase-modulating SLM.

EEE 51. The controller of any of EEEs 43-50, wherein said temporal lightfield simulation module is configured to model transitional states of said phase-modulating SLM based at least in part on a characteristic of a lightfield incident on said phase-modulating SLM.

EEE 52. The controller of EEE 51, wherein said temporal lightfield simulation module is configured to model transitional states of said phase modulating SLM based at least in part on a history of said lightfield.

EEE 53. The controller of any of EEEs 43-52, wherein said temporal lightfield simulation module models each pixel of a plurality of pixels of said phase-modulating SLM as a source of spherical waves having a phase delay determined at least in part by a corresponding one of said transitional states.

EEE 54. The method of any of EEEs 43-52, wherein said temporal lightfield simulation module models each pixel of a plurality of pixels of said phase-modulating SLM as an origin point of a light ray having an angle with respect to a surface of said phase-modulating SLM determined at least in part by a corresponding one of said transitional states.

EEE 55. The controller of any of EEEs 43-54, wherein said first frame and said second frame are temporally sequential.

EEE 56. The controller of EEE 55, wherein said third subset of lightfield simulations includes exactly one lightfield simulation.

EEE 57. The controller of EEE 55, wherein said third subset of lightfield simulations includes more than one lightfield simulation.

EEE 58. The controller of any of EEEs 43-57, wherein:
said first frame and said second frame are not temporally sequential; and
said third subset of lightfield simulations corresponds to at least one intervening frame temporally between said first frame and said second frame.

EEE 59. In a projection system, a method for generating images, said method comprising:
receiving (n) frames of image data;
generating (m) frames of phase drive values, each frame of phase drive values being based at least in part on an associated frame of said image data and causing a phase-modulating spatial light modulator (SLM) to be in an associated phase state to generate a lightfield corresponding to said associated frame of image data;
determining (p) transitional phase states of said phase-modulating SLM where p>0, each of said transitional phase states indicative of a lightfield generated by said phase-modulating SLM during a transition between sequential ones of said phase states associated with said phase drive values;
generating a set of lightfield simulations based on said phase drive values and said transitional phase states, each of said lightfield simulations being indicative of a lightfield generated by said phase-modulating SLM and incident on an amplitude-modulating SLM; and
generating a set of frames of amplitude drive values based on said set of lightfield simulations and said frames of image data.

EEE 60. The method of EEE 59, wherein m+p=n.
EEE 61. The method of EEE 59, wherein m/p=1.
EEE 62. The method of EEE 59, wherein m/p<1.
EEE 63. The method of EEE 59, wherein m=n.
EEE 64. The method of EEE 63, wherein p=n.
EEE 65. The method of EEE 63, wherein p/m>1.
EEE 66. The method of EEE 63, wherein p/m=3.

EEE 67. A non-transitory, computer-readable medium having code embodied therein for causing a projection system to:
receive (n) frames of image data;
generate (m) frames of phase drive values, each frame of phase drive values being based at least in part on an associated frame of said image data and causing a phase-modulating spatial light modulator (SLM) to be in an associated phase state to generate a lightfield corresponding to one of said frames of image data;
determine (p) transitional phase states of said phase-modulating SLM where p>0, each of said transitional phase states indicative of a lightfield generated by said phase-modulating SLM during a transition between sequential ones of said phase states associated with said phase drive values;

generate a set of lightfield simulations based on said phase drive values and said transitional phase states, each of said lightfield simulations being indicative of a lightfield generated by said phase-modulating SLM and incident on an amplitude-modulating SLM; and generate a set of frames of amplitude drive values based on said set of lightfield simulations and said set of frames of image data.

EEE 68. A projection system, comprising:

a beam-steering spatial light modulator (SLM) configured to be driven with a first set of beam-steering drive values at a first time and a second set of beam-steering drive values at a second time, said first set of beam-steering drive values causing said beam-steering SLM to be in a first state, and said second set of beam-steering drive values causing said beam-steering SLM to be in a second state; and means for modeling a transition of said beam-steering SLM from said first state to said second state and determining a third state of said beam-steering SLM at a third time based at least in part on said model of said transition of said beam-steering SLM, said third time occurring between said first time and said second time; and a lightfield simulator configured to generate a lightfield simulation of a lightfield generated by said beam-steering SLM at said third time based at least in part on said third state of said beam-steering SLM.

The invention claimed is:

1. In a projection system, a method for generating a lightfield simulation, said method comprising:

driving a beam-steering spatial light modulator (SLM) with a first set of drive values to place said beam-steering SLM in a first state at a first time;

driving said beam-steering SLM with a second set of drive values that cause said beam-steering SLM to transition from said first state of said beam-steering SLM to a second state of said beam-steering SLM at a second time;

modeling said transition of said beam-steering SLM from said first state to said second state;

determining a third state of said beam-steering SLM at a third time based at least in part on said model of said transition of said beam-steering SLM, said third time occurring between said first time and said second time; and generating a lightfield simulation of a lightfield generated by said beam-steering SLM at said third time based at least in part on said third state of said beam-steering SLM.

2. The method of claim 1, wherein said step of modeling said transition of said beam-steering SLM from said first state to said second state includes modeling said transition of said beam-steering SLM based at least in part on an age of said beam-steering SLM.

3. The method of claim 1, wherein said step of modeling said transition of said beam-steering SLM from said first state to said second state includes modeling said transition of said beam-steering SLM based at least in part on said first state and said second state of said beam-steering SLM.

4. The method of claim 1, wherein said step of modeling said transition of said beam-steering SLM from said first state to said second state includes modeling said transition of said beam-steering SLM based at least in part on physical characteristics of a liquid crystal layer of said beam-steering SLM.

5. The method of claim 1, wherein:

said beam-steering SLM includes a plurality of pixels; and said step of modeling said transition of said beam-steering SLM from said first state to said second state includes modeling said transition of said beam-steering SLM on a pixel-by-pixel basis.

6. The method of claim 1, wherein:

said beam-steering SLM includes a plurality of pixels; and said step of modeling said transition of said beam-steering SLM from said first state to said second state includes modeling said transition of said beam-steering SLM based at least in part on crosstalk between pixels of said plurality of pixels.

7. The method of claim 1, wherein said step of modeling said transition of said beam-steering SLM from said first state to said second state includes modeling said transition of said beam-steering SLM based at least in part on a temperature of said beam-steering SLM.

8. The method of claim 1, wherein said step of modeling said transition of said beam-steering SLM from said first state to said second state includes modeling said transition of said beam-steering SLM based at least in part on an intensity of a lightfield incident on said beam-steering SLM.

9. The method of claim 1, wherein said step of modeling said transition of said beam-steering SLM from said first state to said second state includes modeling said transition of said beam-steering SLM based at least in part on a physical property of a lightfield incident on said beam-steering SLM.

10. The method of claim 1, wherein said step of modeling said transition of said beam-steering SLM from said first state to said second state includes modeling said transition of said beam-steering SLM based at least in part on a total amount of light incident on said beam-steering SLM over a lifetime of said beam-steering SLM.

11. The method of claim 1, wherein said step of modeling a transition of said beam-steering SLM from said first state to said second state includes:

generating a transition function, said transition function being indicative of a relationship between time and a phase delay imparted on an incident lightfield by a pixel of said beam-steering SLM; and determining a value of said transition function at said third time.

12. The method of claim 11, wherein said step of determining a value of said transition function at said third time includes determining an average of said transition function over a time period including said third time.

13. The method of claim 1, further comprising determining a plurality of states of said beam-steering SLM at a plurality of times based at least in part on said model of said transition of said beam-steering SLM, each of said plurality of times occurring between said first time and said second time.

14. A controller for controlling a projection system, said controller comprising:

a processing unit configured to execute code;

an interface coupled to receive image data indicative of at least one image to be displayed; and memory electrically coupled to store data and said code, said data and said code including a beam-steering drive module configured to drive a beam-steering spatial light modulator (SLM) with a first set of drive values to place said beam-steering SLM in a first state at a first time, and drive said beam-steering SLM with a second set of drive values that cause said beam-steering SLM to transition from said first state of said beam-steering SLM to a second state of said beam-steering SLM at a second time, and a temporal lightfield simulation module configured to model said transition of said beam-steering SLM from said first state to said second state, determine a third state of said beam-steering SLM at a third time based at least in part on said model of said transition of said beam-steering SLM, said third time occurring between said first time and said second time, and generate a lightfield simulation of a lightfield generated by said beam-steering SLM at said third time based at least in part on said third state of said beam-steering SLM.

15. The controller of claim 14, wherein said temporal lightfield simulation module is configured to model said transition of said beam-steering SLM based at least in part on an age of said beam-steering SLM.

16. The controller of claim 14, wherein said temporal lightfield simulation module is configured to model said transition of said beam-steering SLM based at least in part on said first state and said second state of said beam-steering SLM.

17. The controller of claim 14, wherein said temporal lightfield simulation module is configured to model said transition of said beam-steering SLM based at least in part on physical characteristics of a liquid crystal layer of said beam-steering SLM.

18. The controller of claim 14, wherein:
said beam-steering SLM includes a plurality of pixels; and
said temporal lightfield simulation module is configured to model said transition of said beam-steering SLM on a pixel-by-pixel basis.

19. The controller of claim 14, wherein:
said beam-steering SLM includes a plurality of pixels; and
said temporal lightfield simulation module is configured to model said transition of said beam-steering SLM based at least in part on crosstalk between pixels of said plurality of pixels.

20. A projection system, comprising:
a beam-steering spatial light modulator (SLM) configured to be driven with a first set of beam-steering drive values at a first time and a second set of beam-steering drive values at a second time, said first set of beam-steering drive values causing said beam-steering SLM to be in a first state, and said second set of beam-steering drive values causing said beam-steering SLM to be in a second state; and means for modeling a transition of said beam-steering SLM from said first state to said second state and determining a third state of said beam-steering SLM at a third time based at least in part on said model of said transition of said beam-steering SLM, said third time occurring between said first time and said second time; and a lightfield simulator configured to generate a lightfield simulation of a lightfield generated by said beam-steering SLM at said third time based at least in part on said third state of said beam-steering SLM.

* * * * *